US011030422B2

(12) United States Patent
Uchida et al.

(10) Patent No.: US 11,030,422 B2
(45) Date of Patent: Jun. 8, 2021

(54) INFORMATION DISPLAY DEVICE AND INFORMATION DISPLAY SYSTEM

(71) Applicant: Panasonic Intellectual Property Management Co., Ltd., Osaka (JP)

(72) Inventors: Osamu Uchida, Kanagawa (JP); Mikio Morioka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 16/366,311

(22) Filed: Mar. 27, 2019

(65) Prior Publication Data

US 2019/0220521 A1 Jul. 18, 2019

Related U.S. Application Data

(63) Continuation of application No. PCT/JP2017/032450, filed on Sep. 8, 2017.

(30) Foreign Application Priority Data

Feb. 8, 2017 (JP) .............................. JP2017-021220

(51) Int. Cl.
*G06F 40/58* (2020.01)
*H04M 3/42* (2006.01)
*G06F 13/00* (2006.01)

(52) U.S. Cl.
CPC .............. *G06F 40/58* (2020.01); *G06F 13/00* (2013.01); *H04M 3/42229* (2013.01); *H04M 2203/2061* (2013.01); *H04M 2207/18* (2013.01)

(58) Field of Classification Search
CPC .... G06F 40/211; G06F 40/253; G06F 40/268; G06F 40/284; G06F 40/30; G06F 40/58; G06F 40/44; G06F 40/45; G06F 40/47
See application file for complete search history.

(56) References Cited

U.S. PATENT DOCUMENTS 7,221,933 B2 * 5/2007 Sauer ................ H04M 3/42382
455/412.1
9,705,618 B1 * 7/2017 Poornachandran .... G06Q 10/02
(Continued)

FOREIGN PATENT DOCUMENTS

JP 2003-271597 9/2003
JP 2013-125047 6/2013
(Continued)

OTHER PUBLICATIONS

International Search Report of PCT application No. PCT/JP2017/032450 dated Nov. 21, 2017.

*Primary Examiner* — Lamont M Spooner
(74) *Attorney, Agent, or Firm* — McDermott Will and Emery LLP

(57) ABSTRACT

An information display device is an information display device for allowing content to be output in a plurality of languages, and includes a management information acquisition unit, a priority determination unit, and an image generator. The management information acquisition unit acquires management information including language information including information indicating a language used by sojourners in an area where the information display device is used, and sojourn information including information indicating a sojourn situation of the sojourners in the area. Based on the acquired management information, the priority determination unit determines priority of the languages used in the information display device. The image generator generates a display image in accordance with the priority.

19 Claims, 18 Drawing Sheets

(56) References Cited

U.S. PATENT DOCUMENTS

| | | | |
|---|---|---|---|
| 9,798,716 B2* | 10/2017 | Niles | G06F 9/4451 |
| 9,946,556 B2* | 4/2018 | Kim | G06F 9/454 |
| 9,992,326 B1* | 6/2018 | Koller | H04W 4/02 |
| 2003/0149557 A1 | 8/2003 | Cox et al. | |
| 2004/0192258 A1* | 9/2004 | Atkin | H04L 12/1845 |
| | | | 455/412.1 |
| 2008/0021697 A1 | 1/2008 | Cox et al. | |
| 2008/0294424 A1* | 11/2008 | Naito | G06Q 30/02 |
| | | | 704/8 |
| 2009/0048820 A1* | 2/2009 | Buccella | G06F 40/58 |
| | | | 704/2 |
| 2009/0077494 A1* | 3/2009 | Sjolin | G06F 3/0237 |
| | | | 715/810 |
| 2010/0185434 A1* | 7/2010 | Burvall | G10L 15/005 |
| | | | 704/3 |
| 2011/0231528 A1* | 9/2011 | Ishii | H04L 67/18 |
| | | | 709/220 |
| 2013/0067307 A1 | 3/2013 | Tian et al. | |
| 2013/0124186 A1* | 5/2013 | Donabedian | H04L 67/025 |
| | | | 704/2 |
| 2014/0019273 A1* | 1/2014 | Sprowl | G06F 40/40 |
| | | | 705/16 |
| 2015/0248399 A1* | 9/2015 | Patil | H04W 4/029 |
| | | | 704/8 |
| 2016/0249096 A1* | 8/2016 | Ortiz | H04N 21/4367 |
| 2018/0137103 A1* | 5/2018 | Watson | G09B 21/006 |
| 2018/0192290 A1* | 7/2018 | Soulez | H04M 3/42042 |

FOREIGN PATENT DOCUMENTS

| | | |
|---|---|---|
| JP | 2014-526723 | 10/2014 |
| JP | 2016-091474 | 5/2016 |
| WO | 2013/033910 | 3/2013 |

\* cited by examiner

| ID (MAC ADDRESS) | FINAL CONNECTION TIME |
|---|---|
| 08-00-20-1F-96-44 | 12:55 |
| 08-22-24-3A-12-23 | 12:10 |
| : | : |

| LANGUAGE | DEFAULT PRIORITY | UPDATED PRIORITY | PRIORITY ORDER |
|---|---|---|---|
| ENGLISH | 7 | 11 | 2 |
| CHINESE | 6 | 6 | 3 |
| THAI | 5 | 5 | |
| VIETNAMESE | 4 | 12 | 1 |
| KOREAN | 3 | 3 | |
| ⋮ | ⋮ | ⋮ | ⋮ |

121

| GUEST NAME | CHECK-IN DATE | CHECK-OUT DATE | ROOM | USE LANGUAGE |
|---|---|---|---|---|
| John Smith | 10/11 | 10/14 | Studio | English |
| Chen Chin Feng | 10/12 | 10/20 | Superior | Chinese |
| .. | .. | .. | .. | .. |

INFORMATION DISPLAY DEVICE AND INFORMATION DISPLAY SYSTEM

TECHNICAL FIELD

The present disclosure relates to an information display device and an information display system for supporting communication between different languages.

BACKGROUND ART

In recent years, automatic translation systems that can deal with a plurality of languages for supporting communication in different languages have been known. In such a system, in order to deal with diversification of languages used, a technique to provide a service corresponding to use language information transmitted by a computer terminal each person uses is known (for example, refer to PTL 1). Also, a technique to provide a selection screen of a plurality of languages extracted in advance based on a use history of a computer terminal each person uses is known (for example, refer to PTL 2). A technique to provide a computer terminal each person uses with a screen for selecting a language to be used in an area each person visits is known (for example, refer to PTL 3).

CITATION LIST

Patent Literature

PTL 1: Unexamined Japanese Patent Publication No. 2013-125047
PTL 2: Japanese Patent Unexamined Publication (Translation of PCT Application) No. 2014-526723
PTL 3: Unexamined Japanese Patent Publication No. 2003-271597

SUMMARY

When there are a large number of languages available in an automatic translation service, it is extremely inconvenient to select a use language from the large number of languages on a selection screen of a limited size. Therefore, extracting in advance languages with a strong possibility of being used and displaying the extracted languages on a screen with priority will improve convenience.

In the above-described techniques, the language to be used by each person is determined based on use language information each computer terminal transmits or a user's use history. Therefore, information from the computer terminal each person owns or carries is needed. However, for a translation service using a translation terminal installed in a facility or an area where a large number of unspecified people go in and out, it is difficult to predict and extract in advance a language with a strong possibility that each person will use.

In a communication support service to be provided to a large number of unspecified people in a predetermined area where a large number of unspecified people go in and out, the present disclosure provides an information display device and an information display system that can dynamically extract languages with a strong possibility of being used, and can provide a screen corresponding to the extracted languages.

An information display device according to the present disclosure is an information display device for allowing content to be output in a plurality of languages, and includes a management information acquisition unit, a priority determination unit, and an image generator. The management information acquisition unit acquires management information including language information including information indicating a language used by a sojourner in an area where the information display device is used and sojourn information including information indicating a sojourn situation of the sojourner in the area. The priority determination unit determines priority of each of the languages used by the information display device based on the acquired management information. The image generator generates a display image in accordance with the priority.

An information display system according to the present disclosure is an information display system for allowing content to be output in a plurality of languages, and includes a storage unit, a priority determination unit, and an image generator. The storage unit stores management information including language information including information indicating a language used by a sojourner in a predetermined area and sojourn information including information indicating a sojourn situation of the sojourner in the predetermined area. The priority determination unit determines priority of each of the languages used by the information display system based on the management information. The image generator generates a display image in accordance with the priority.

In a communication support service to be provided in a predetermined area where a large number of unspecified people go in and out, an information display device and an information display system according to the present disclosure dynamically extract languages with a strong possibility of being used, and provide a screen corresponding to the extracted languages. This can improve convenience.

BRIEF DESCRIPTION OF DRAWINGS

FIG. 9 is a diagram showing an example of priority information according to the first exemplary embodiment.

DESCRIPTION OF EMBODIMENTS

Figure 1:
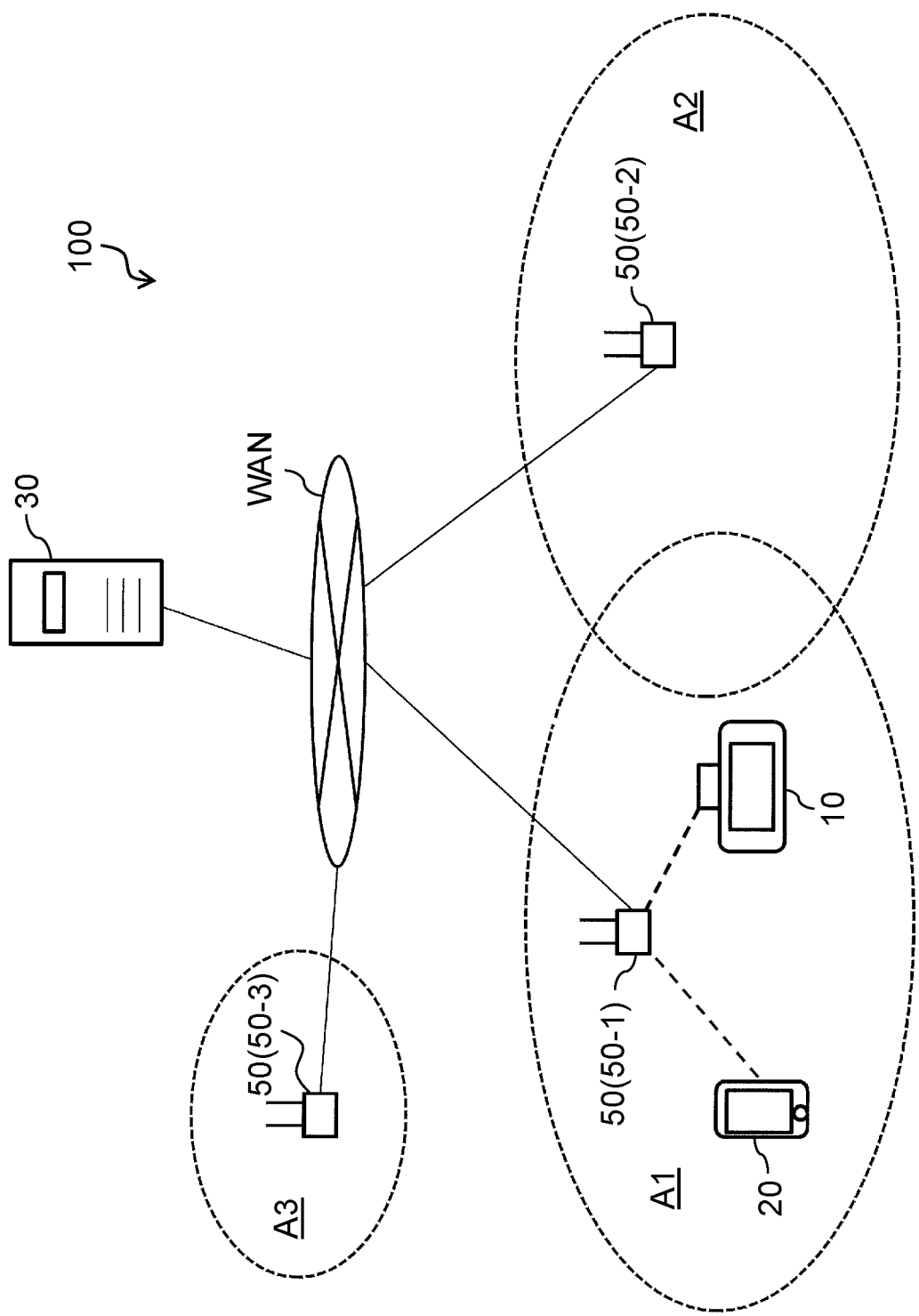
FIG. 1 is an overall configuration diagram of an information display system according to a first exemplary embodiment.

Exemplary embodiments will be described in detail below with appropriate reference to the drawings. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventors provide the accompanying drawings and the following description to help those skilled in the art to fully comprehend the present disclosure, with no intention to limit subject matters recited in the claims by means of the drawings and the description.

In the following description, a "user" refers to a person who uses an information display device according to the present disclosure (for example, translation terminal 10 in FIG. 1) in a predetermined area. "Sojourners" or "area sojourners" in the predetermined area refer to a plurality of persons who stays in the area (there are both cases where the "user" is included and not included). The "predetermined area" also includes a predetermined building or facility in addition to a predetermined range or region.

The information display device and an information display system according to the present disclosure are provided in the predetermined area where a large number of unspecified people go in and out. In a translation service or the like that can process many languages, the information display device and the information display system according to the present disclosure determine priority of languages with a strong possibility of being used in the predetermined area, and provide a language selection screen in accordance with the priority, or a content screen.

In order to support communication with visitors from various linguistic areas, an automatic translation system needs to deal with a large number of languages. The automatic translation system causes a user to select a language first, then accepts voice input in the selected language, or provides content, such as text, image, and voice in the selected language. However, when selectable languages increase, it will become difficult to select languages smoothly. Meanwhile, for an automatic translation system used at a facility, store, or the like used by a large number of unspecified people, sojourners of the area are not fixed. For example, when group tour visitors from a predetermined linguistic area use a facility or store in the area, language distribution used in the area changes significantly in some cases. When such group tour visitors leave the area, the language distribution will change significantly again. The information display device and the information display system according to the present disclosure dynamically collect language information used in the predetermined area and provide a display screen in more probable languages.

Exemplary embodiments of the present disclosure will be described below.

First Exemplary Embodiment

1-1. Configuration

1-1-1. Configuration of System

FIG. 1 schematically shows an overall configuration of information display system 100 according to one exemplary embodiment of the present disclosure. Information display system 100 includes translation terminal 10 (one example of the information display device), wireless router 50-1 (one example of a wireless access point), and management device 30. A plurality of wireless routers 50 including wireless router 50-1 covers a plurality of area A1 to A3. Management device 30 is connectable to translation terminal 10 and wireless routers 50. Translation terminal 10 is used within a range of area A1, and is connected to wireless router 50-1. Management device 30 is connected to wireless router 50-1 and translation terminal 10 via a wide area network (WAN), such as the Internet. Wireless router 50-1 is connectable to intra-area terminal 20 (one example of a computer terminal) in area A1. Note that intra-area terminal 20 is a terminal carried by each person staying in the area (hereinafter referred to as an area sojourner). Translation terminal 10 may be directly connected to WAN, without via wireless router 50-1.

Information display system 100 according to the present disclosure acquires and manages use language information together with existing connection information. With this information, information display system 100 counts a number of use, for each of the languages used in the area, and reflects a count result on a language selection screen that translation terminal 10 outputs when selecting languages. Specifically, information display system 100 changes order, size, and the like for displaying the languages to select.

A configuration of each device according to the present exemplary embodiment will be described below.

1-1-2. Configuration of Wireless Router

Figure 2:
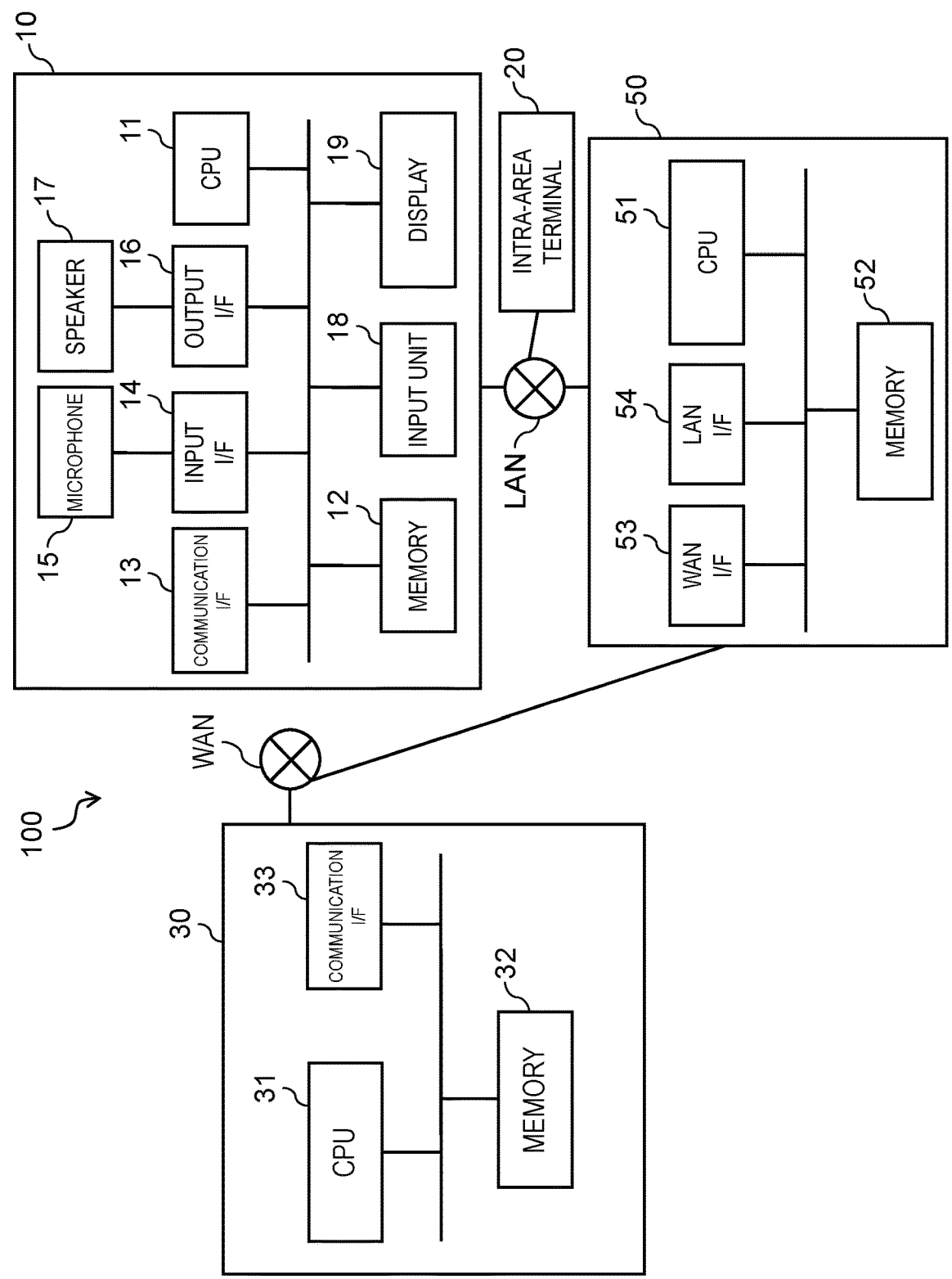
FIG. 2 is a schematic configuration diagram of the information display system according to the first exemplary embodiment.

Wireless router 50 is, for example, a wireless communication device compliant with a wireless local area network (LAN), such as Wi-Fi (registered trademark). As shown in FIG. 2, wireless router 50 includes a central processing unit (CPU) 51, memory 52, wide area network (WAN) interface 53, and LAN interface 54.

CPU 51 is a processor or a circuit that performs processing according to a predetermined program. Memory 52 is, for example, a semiconductor memory, and includes a read only memory (ROM) that stores a control program and the like describing a processing procedure of CPU 51, and a random access memory (RAM) that, temporarily stores the control program and data temporarily as a work memory.

WAN interface 53 includes a communication circuit and an antenna for connecting with the WAN, such as the Internet, and transmits and receives a signal corresponding to connection with the WAN. LAN interface 54 includes a communication circuit and an antenna for communicating with translation terminal 10 and intra-area terminal 20 in a LAN network area.

Figure 3:
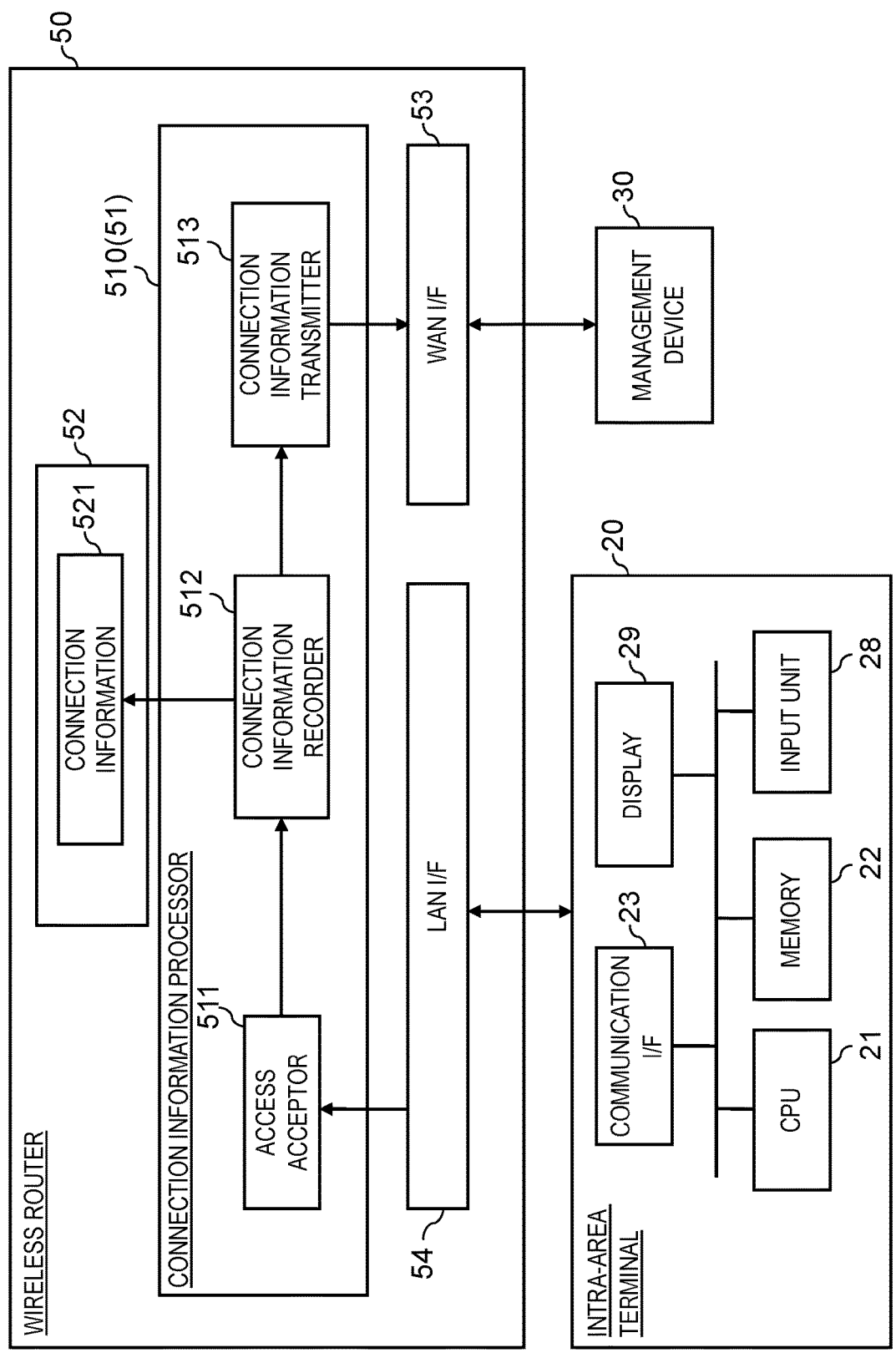
FIG. 3 is a functional block diagram of a wireless router according to the first exemplary embodiment.

As shown in FIG. 3, CPU 51 implements a function of connection information processor 510 to be performed according to the predetermined program stored in memory 52.

Connection information processor 510 includes access acceptor 511, connection information recorder 512, and connection information transmitter 513.

Access acceptor 511 accepts access from intra-area terminal 20.

In response to the access from intra-area terminal 20, connection information recorder 512 performs processing such as update and deletion of connection information 521 stored in memory 52.

Figures 4, 5:
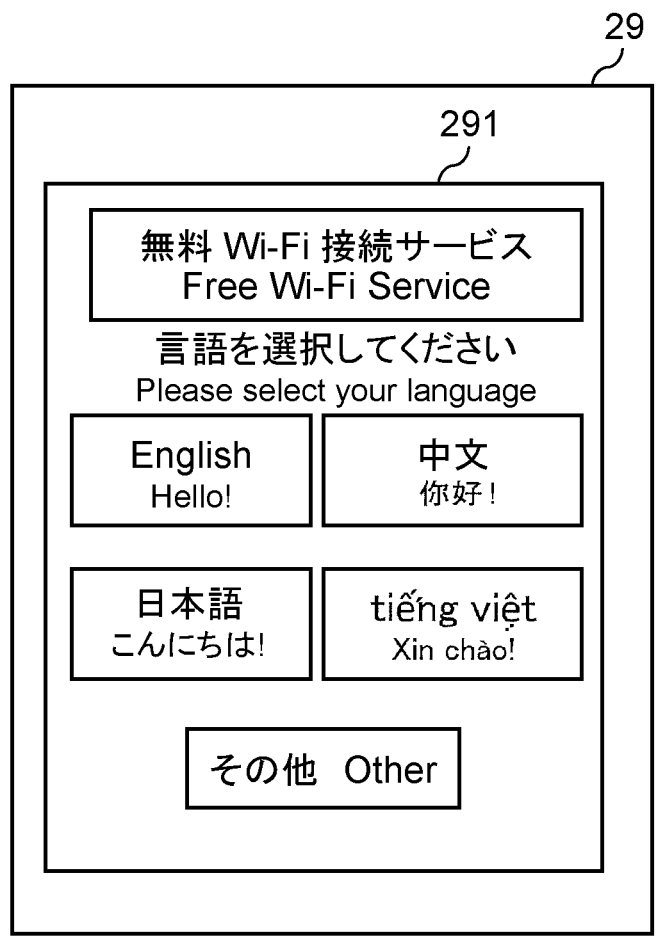
FIG. 4 is a diagram showing an example of connection information according to the first exemplary embodiment.
FIG. 5 is a diagram showing a screen example of an intra-area terminal according to the first exemplary embodiment.

FIG. 4 shows an example of connection information 521. Connection information 521 is generated based on access information acquired from intra-area terminal 20. As described above, connection information recorder 512 acquires identification information on intra-area terminal 20 (for example, media access control (MAC) address), and final connection time of connection to wireless router 50.

Note that in order to limit daily use time or the like, connection information 521 may also manage information such as connection start time and limited connection time together.

Connection information recorder 512 also updates the final connection time in accordance with connection information from intra-area terminal 20 acquired every time intra-area terminal 20 is connected to wireless router 50. When accessed from intra-area terminal 20 that is not included in the connection information stored in memory 52, connection information recorder 512 adds the connection information on intra-area terminal 20 after use registration by management device 30 to be described later. Connection information recorder 512 also deletes the connection information on intra-area terminal 20 that has no connection for predetermined time (for example, 10 minutes since the final connection time).

Connection information transmitter 513 transmits the connection information to management device 30.

Intra-area terminal 20 is a device such as a portable terminal and a smartphone used by the area sojourner. As shown in FIG. 3, intra-area terminal 20 is a computer device including CPU 21, memory 22, communication interface 23, input unit 28, and display 29. Input unit 28 of intra-area terminal 20 accepts input by an operation of the area sojourner. CPU 21 accesses wireless router 50 via communication interface 23 according to a predetermined program retained in memory 22. Display 29 displays language selection screen 291 as shown in FIG. 5 in accordance with language selection screen data provided from management device 30. Language selection screen 291 selectably displays a plurality of languages.

1-1-3. Configuration of Management Device

As shown in FIG. 2, management device 30 is a computer device including CPU 31, memory 32 (one example of a storage unit), and communication interface 33. Management device 30 may be further connected to an external storage device, such as a semiconductor memory, a magnetic memory, and an optical disc.

CPU 31 is a processor or a circuit that performs processing according to a predetermined program. Memory 32 is, for example, a semiconductor memory, and includes a ROM that stores a control program and the like describing a processing procedure of CPU 31, and a RAM that temporarily stores the control program and data temporarily as a work memory. Communication interface 33 includes a communication circuit for connecting to the WAN, such as the Internet.

Figure 6:
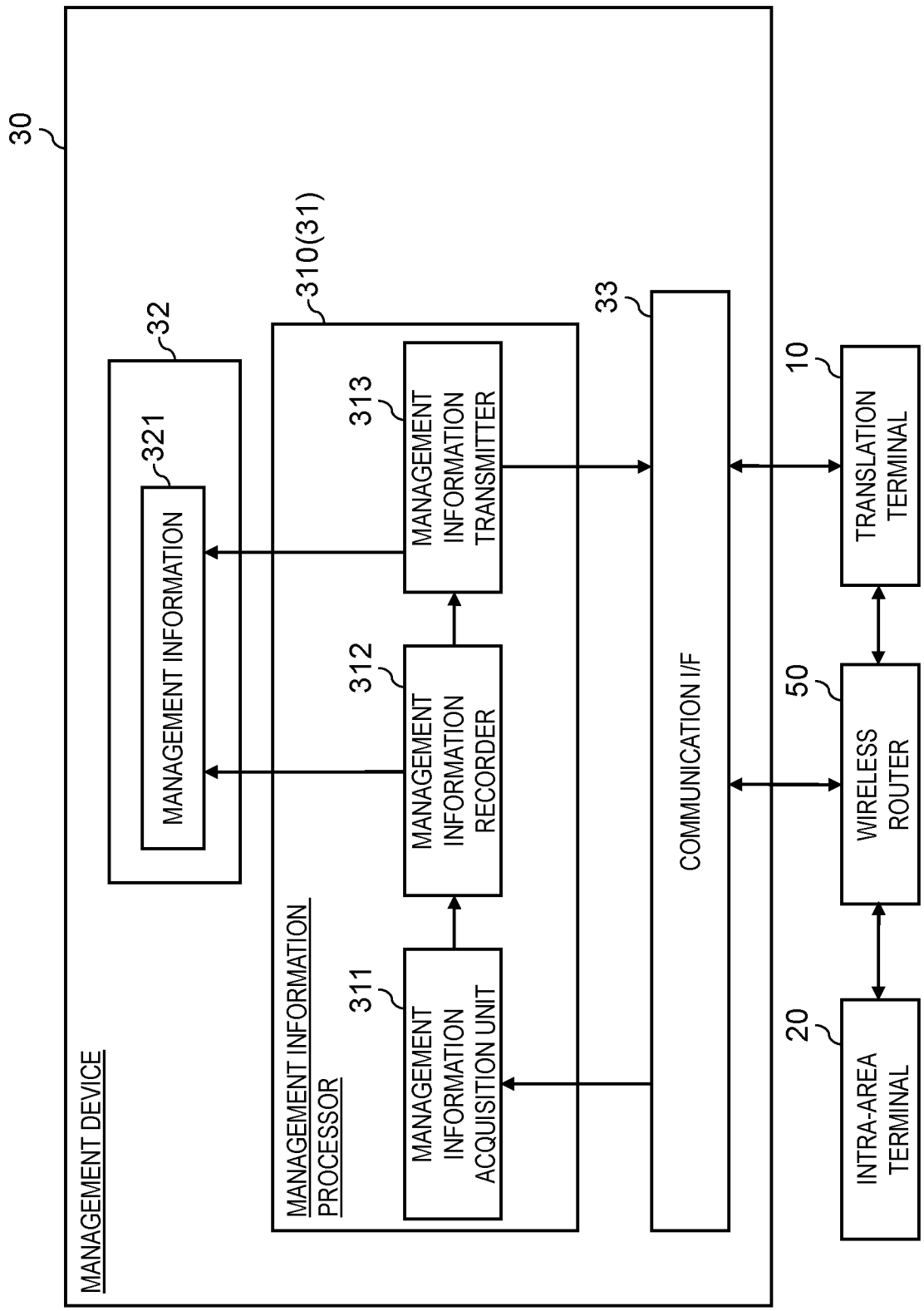
FIG. 6 is a functional block diagram of a management device according to the first exemplary embodiment.

As shown in FIG. 6, CPU 31 implements a function of management information processor 310 to be performed according to the predetermined program stored in memory 32. Management information processor 310 includes management information acquisition unit 311 (one example of information acquisition unit), management information recorder 312, and management information transmitter 313 (one example of a transmitter).

Management information acquisition unit 311 acquires management information including connection information from wireless routers 50 and information from each intra-area terminal 20 via communication interface 33. Note that management information acquisition unit 311 acquires the connection information from a plurality of wireless routers 50 and the information from a plurality of intra-area terminals 20. Intra-area terminals 20 are connected to management device 30 via wireless routers 50.

Management information recorder 312 records and updates, in memory 32, management information 321 acquired from the plurality of wireless routers 50 and intra-area terminals 20. Management information recorder 312 also deletes the management information on intra-area terminal 20 that has no connection for predetermined time (for example, 10 minutes since the final connection time).

Figure 7:
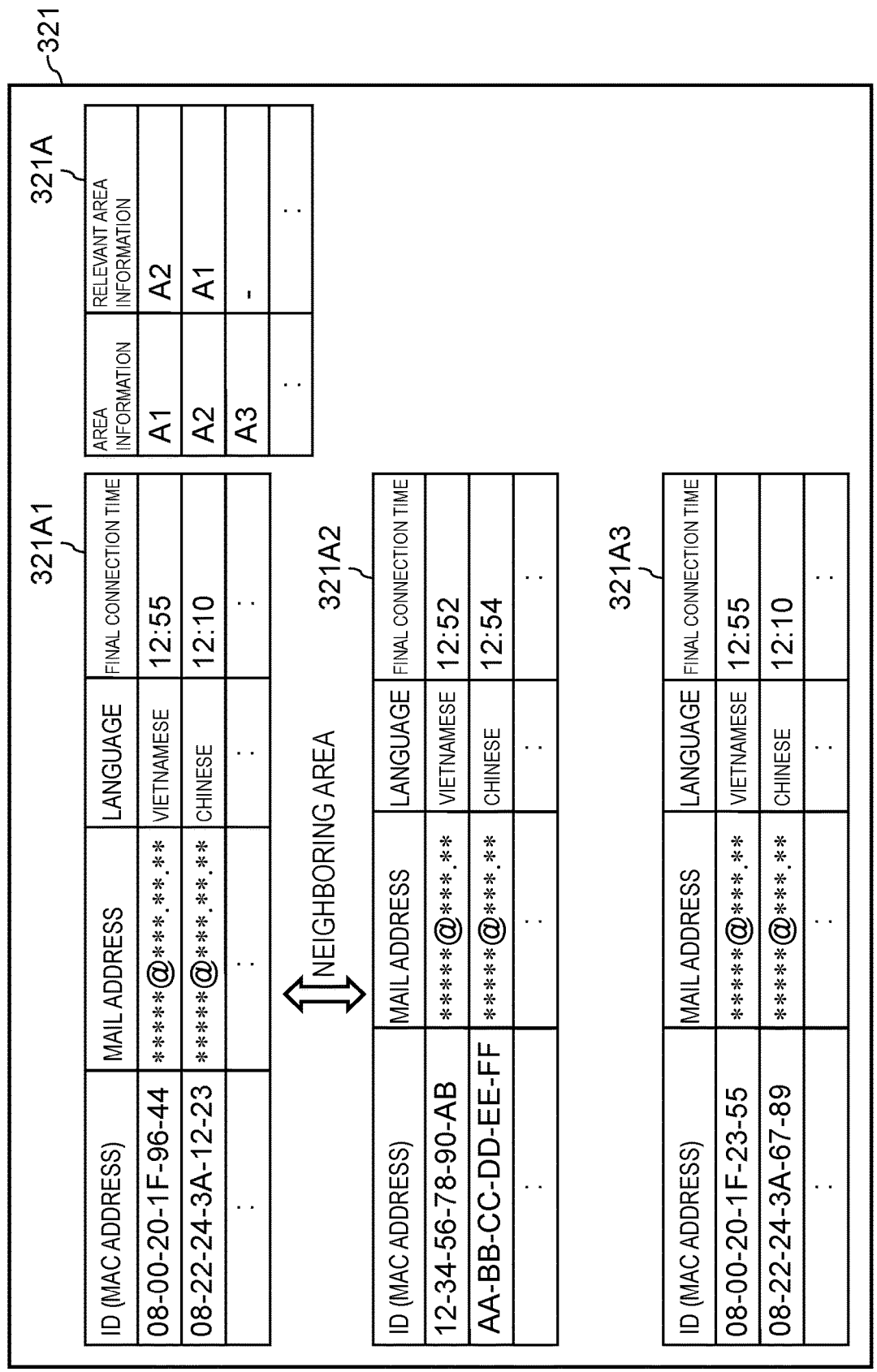
FIG. 7 is a diagram showing an example of management information according to the first exemplary embodiment.

FIG. 7 shows an example of management information 321. As shown in FIG. 7, management information 321 is a list of connection information acquired from each wireless router 50 (MAC address and final connection time), and a mail address and use language information acquired from intra-area terminal 20 at a time of Wi-Fi use registration, in each area (each identification information on wireless router 50). That is, management information 321 includes language information including information indicating languages used by the plurality of sojourners in area A1 where translation terminal 10 is used. Also, management information 321 includes sojourn information including information indicating a sojourn situation of the plurality of sojourners in area A1. Specifically, the sojourn information includes information indicating sojourn time points of the plurality of sojourners in area A1. More specifically, the sojourn information includes information indicating the final connection time between intra-area terminal 20 and wireless router 50-1.

Here, for example, management information 321A1 of wireless router 50-1 of area A1 shown in FIG. 1, management information 321A2 of wireless router 50-2 of area A2, and management information 321A3 of wireless router 50-3 of area A3 are illustrated. Management information 321 also retains relevant area information 321A that associates each area with a neighboring area as will be describes later.

Note that in order to limit daily use time or the like, management information 321 may also manage information such as connection start time and limited connection time together.

Management information transmitter 313 transmits the corresponding management information to each translation terminal 10. For example, when management information transmitter 313 transmits the management information to translation terminal 10 of area A1, management information 321A1 corresponding to area A1 and management information 321A2 corresponding to area A2 associated based on relevant area information 321A are transmitted. As shown in FIG. 1, since area A1 is close to area A2, there is a strong possibility that there are common sojourners in the two areas. Therefore, languages used in these two areas are counted for priority determination to be described later. Meanwhile, for area A3 distant from area A1 (refer to FIG. 1), area A1 is not associated with area A3. Therefore, languages used in area A3 are not counted.

1-1-4. Configuration of Translation Terminal

Translation terminal 10 (one example of the information display device) is a wearable or tablet computer terminal device. Translation terminal 10 translates content represented in voice, image, text, or the like into a language selected by a user of translation terminal 10 and outputs the translated content on a screen or by voice, or responds to voice input in the language selected by the user. As shown in FIG. 2, translation terminal 10 is a computer terminal device including CPU 11, memory 12, communication interface 13, input interface 14, microphone 15, output interface 16, speaker 17, input unit 18, and display 19.

CPU 11 is a processor or a circuit that performs processing according to a predetermined program. Memory 12 includes a ROM that stores a control program and the like describing a processing procedure of CPU 11, and a RAM that temporarily stores the control program and data temporarily as a work memory. Communication interface 13 is a communication circuit that is communicative wirelessly or by wire. Input interface 14 is a connection unit to be connected to microphone 15, and receives analog-to-digital (A/D)-converted voice data from microphone 15. Output interface 16 is a connection unit to be connected to speaker 17 and transmits digital-to-analog (D/A)-converted voice to speaker 17.

Input unit 18 accepts an input operation of a user by means of a touch panel, a keyboard, or a pointing device (e.g., mouse). Display 19 includes a liquid crystal panel, an organic electroluminescence (EL) panel, or a panel similar to these panels, and displays the language selection screen, translated content, and the like.

Figure 8:
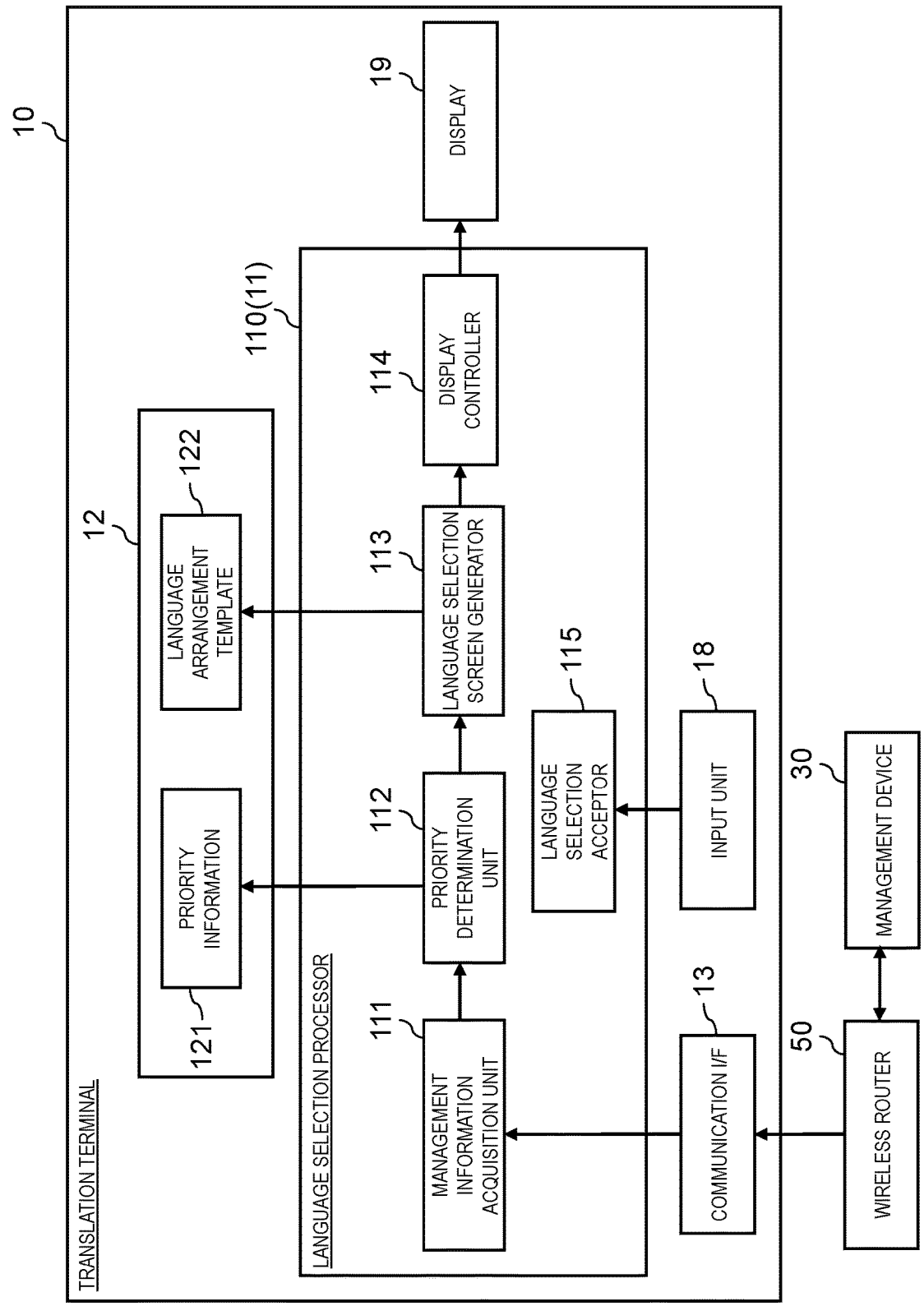
FIG. 8 is a functional block diagram of a translation terminal according to the first exemplary embodiment.

As shown in FIG. 8, CPU 11 implements a function of language selection processor 110 to be performed according to the predetermined program stored in memory 12. Language selection processor 110 includes management information acquisition unit 111, priority determination unit 112, language selection screen generator 113 (one example of an image generator), display controller 114, and language selection acceptor 115.

Management information acquisition unit 111 acquires the management information from management device 30 via communication interface 13. For example, when translation terminal 10 shown in FIG. 1 is taken as an example, the management information to be acquired is management information 321A1 and management information 321A2 shown in FIG. 7. Management information acquisition unit 111 acquires the management information, for example, via wireless router 50.

Priority determination unit 112 counts a number of use, for each of the languages that may be currently used, in the area based on the language information and the final connection time included in the acquired management information. Then, priority determination unit 112 determines priority of the languages in decreasing order of the number of use, and stores the priority as priority information 121. That is, priority determination unit 112 determines the priority based on the management information.

It is determined whether there is any possibility of being currently used from the final connection time included in the management information. For example, when current time is 12:57, intra-area terminals 20 finally connected within 10 minutes are extracted. For management information 321A1 and management information 321A2 shown in FIG. 7, terminals finally connected within 10 minutes before 12:57 are two terminals using Vietnamese and one terminal using Chinese. Therefore, Vietnamese is counted as 2 and Chinese is counted as 1.

Here, Wi-Fi users with the final connection time of within 10 minutes are extracted because a determination is made that there is a stronger possibility that the Wi-Fi users with the final connection time of within 10 minutes will stay in the area of translation terminal 10 than Wi-Fi users with the final connection time of over 10 minutes (that is, a possibility of using translation terminal 10 is stronger). Similarly, a greater weight may be assigned to the count as the final connection time is closer to the current time. For example, a weight of a Wi-Fi user with the final connection time of n minutes before the current time is $(20-n)/10$ $(0 \le n \le 20)$, or 0 $(20<n)$. By assigning such a weight, a greater weight can be assigned to the Wi-Fi user with a strong possibility of being near translation terminal 10 until more recently. This allows improvement in accuracy of estimation of languages that may be used by translation terminal 10.

In addition to the final connection time, as the sojourn situation that should be considered, a probability that each user has left the area by the current time may be taken into consideration. For example, it is assumed that Wi-Fi user A has used Wi-Fi of a hotel lobby until 17:55, and has a reservation for a restaurant from 18:00. In this case, there is a strong possibility that Wi-Fi user A has left the hotel lobby at the current time of 18:05. Meanwhile, it is assumed that the final connection time of Wi-Fi user B is 17:40 and that Wi-Fi user B waits for a friend at 18:15 in the hotel lobby. In this case, there is a strong possibility that Wi-Fi user B is in the hotel lobby at the current time of 18:05. In this case, a greater weight is preferably assigned to Wi-Fi user B than Wi-Fi user A. Thus, each Wi-Fi user's schedule information is referred to, and a probability that each Wi-Fi user leaves the area is also taken into consideration. This makes it possible to perform more accurate estimation about use languages in the area.

FIG. 9 shows an example of priority information 121. Priority information 121 includes object languages, default priority (default values), updated priority, and priority order. The object languages are languages available in translation terminal 10. The default priority is generally high-use frequency languages with weights assigned. The updated priority is a language count result based on the acquired management information reflected on the default priority. For example, for one language speaker, four points are added to the default priority. The priority order is order of languages with a strong possibility of being used in the area determined depending on the updated priority.

Note that the priority may be determined only from the language count result based on the acquired management information without providing the default priority.

Figure 10A:
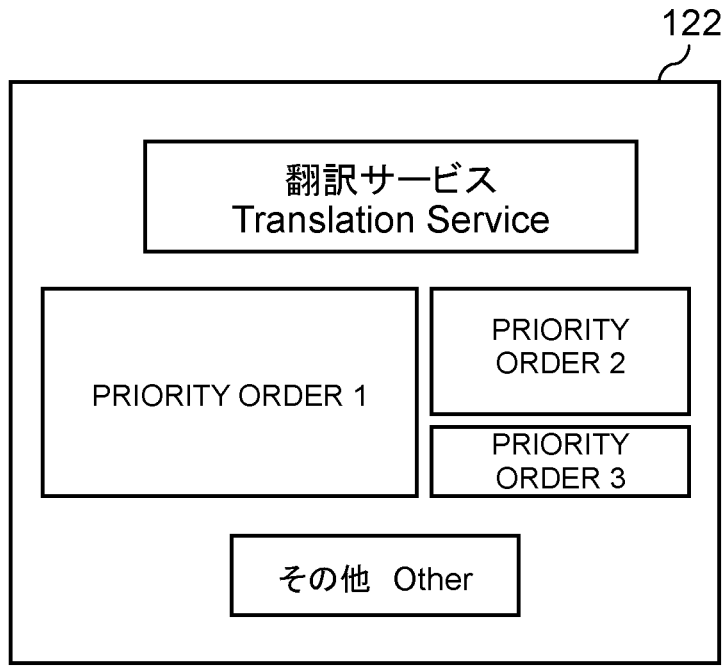
FIG. 10A is a diagram showing an example of a language selection template according to the first exemplary embodiment.

Language selection screen generator 113 generates the language selection screen for selecting languages in accordance with the determined priority (priority order). The language selection screen is generated, for example, in accordance with language arrangement template 122 shown in FIG. 10A. As shown in FIG. 10A, language arrangement template 122 has a configuration in which languages are more greatly displayed in decreasing priority order (on a left side or upper side).

Figure 10B:
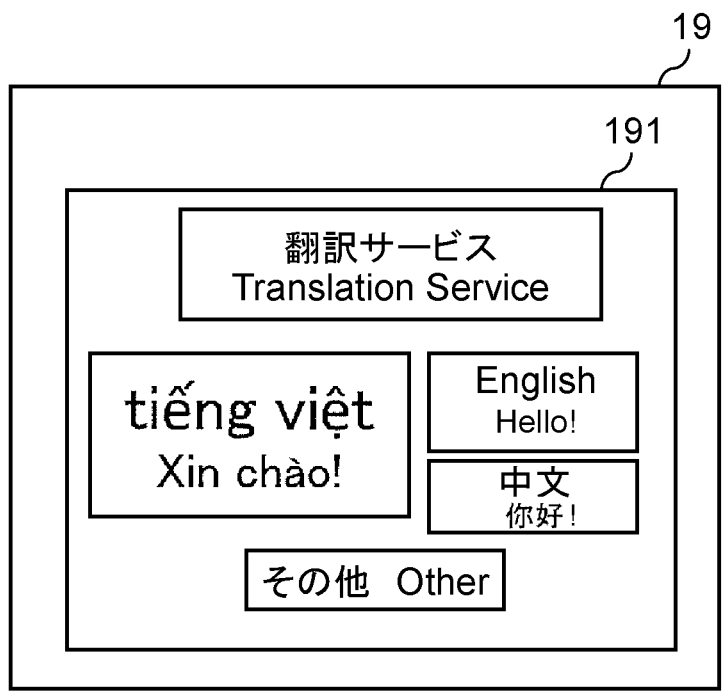
FIG. 10B is a diagram showing an example of a language selection screen according to the first exemplary embodiment.

Display controller 114 controls display 19 to display the generated language selection screen. For example, as shown in FIG. 10B, display 19 displays language selection screen 191 in which languages are more greatly displayed in decreasing priority order (on a left side or upper side).

Language selection acceptor 115 accepts a language selection command generated by the user of translation terminal 10 who looks at language selection screen 191 operating input unit 18. In response to voice input in the selected language, translation terminal 10 outputs a translation result corresponding to the selected language (translated text, image, voice, or the like). Note that through connection with a server such as a voice recognition server, a translation server, and a voice synthesis server, translation terminal 10 outputs the translation result as voice or display.

1-2. Operation

An operation of information display system 100 according to the first exemplary embodiment will be described below with reference to FIG. 11 to FIG. 13.

1-2-1. Operation of Wireless Router

Figure 11:
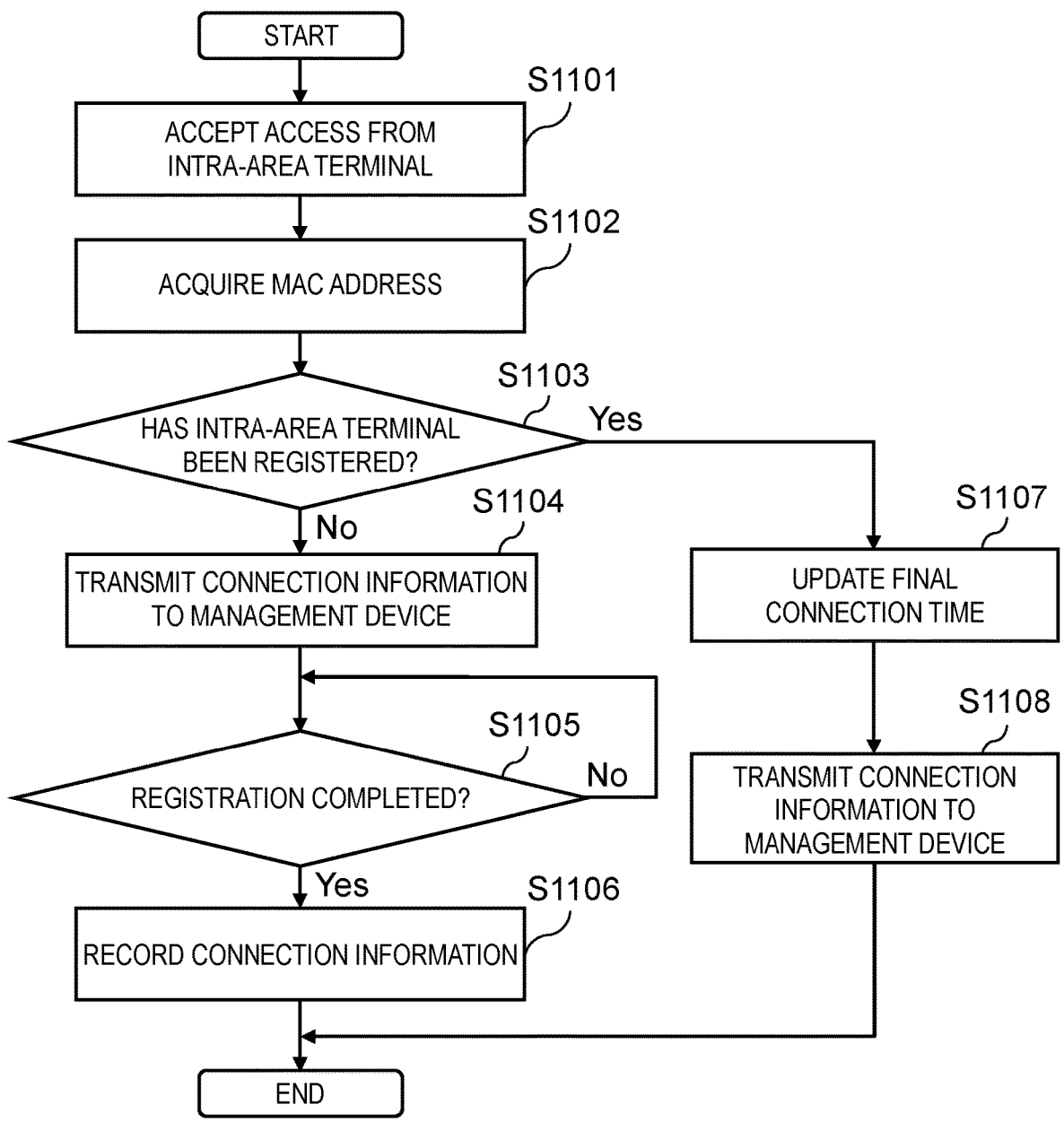
FIG. 11 is a flowchart showing processing to be performed by the wireless router according to the first exemplary embodiment.
Figure 12:
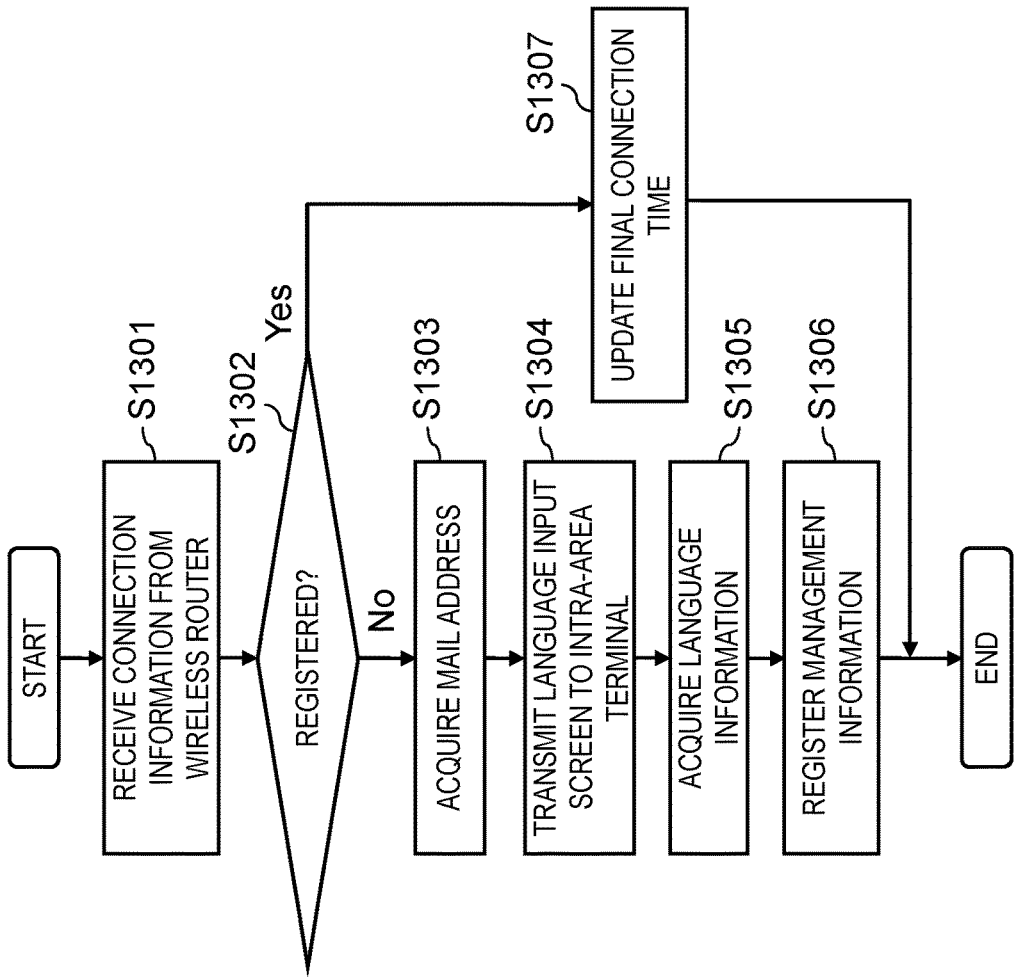
FIG. 12A is a flowchart showing processing to be performed by the management device according to the first exemplary embodiment.
FIG. 12B is a flowchart showing processing to be performed by the management device according to the first exemplary embodiment.

FIG. 11 shows processing to be mainly performed by connection information processor 510 of wireless router 50 (refer to FIG. 3).

S1101: Access acceptor 511 accepts access from intra-area terminal 20.

S1102: Access acceptor 511 acquires the MAC Address, which is identification information on intra-area terminal 20.

S1103: With reference to the connection information stored in memory 52, connection information recorder 512 determines whether accessed intra-area terminal 20 has been registered. When it is determined that intra-area terminal 20 has not been registered, the process proceeds to step S1104, whereas when it is determined that intra-area terminal 20 has been registered, the process proceeds to step S1107.

S1104: When it is determined in step S1103 that the connection information on intra-area terminal 20 has not been registered, connection information transmitter 513 transmits the acquired connection information to management device 30.

S1105: Management device 30 performs Wi-Fi use registration processing, as will be describe later. When the registration is completed, connection information processor 510 receives a notification about the registration completion from management device 30.

S1106: Connection information recorder 512 adds and records new connection information.

S1107: On the other hand, when it is determined in step S1103 that the connection information on intra-area terminal 20 has been registered, connection information recorder 512 updates the final connection time of accessed intra-area terminal 20. Here, the final connection time when each intra-area terminal 20 is connected is always recorded.

S1108: Connection information transmitter 513 transmits the updated connection information to management device 30.

Intra-area terminal 20 that is registered with management device 30 and connected to wireless router 50 is provided with Internet connection services via wireless router 50.

1-2-2. Operation of Management Device

FIG. 12A shows processing to be mainly performed by management information processor 310 of management device 30 (refer to FIG. 6).

S1301: Management information acquisition unit 311 accepts access from wireless router 50. Then, management information acquisition unit 311 receives the connection information on intra-area terminal 20 together with the identification information on wireless router 50.

S1302: Management information recorder 312 refers to the management information stored in memory 32, and determines whether Wi-Fi use of intra-area terminal 20 with the connection information acquired has been registered. When it is determined that the Wi-Fi use has not been registered, the process proceeds to step S1303, whereas when it is determined that the Wi-Fi use has been registered, the process proceeds to step S1307.

S1303: Management information acquisition unit 311 acquires the mail address from target intra-area terminal 20. Management information transmitter 313 transmits a mail including uniform resource locator (URL) of management device 30 and the like to the mail address. In response to the mail transmission, intra-area terminal 20 accesses the URL of management device 30 and the like.

S1304: In response to access by intra-area terminal 20, management information transmitter 313 transmits a language input screen to intra-area terminal 20. In intra-area terminal 20, language information to be used by a sojourner carrying intra-area terminal 20 is selected on the language input screen displayed via a browser or the like.

Note that instead of providing the language input screen, management device 30 may automatically acquire language information that is set in a browser, a terminal operating system (OS), or the like of intra-area terminal 20. In this case, the language information may be acquired when intra-area terminal 20 accesses the URL of management device 30 or the like.

S1305: Management information acquisition unit 311 acquires the language information from intra-area terminal 20.

S1306: Management information recorder 312 registers management information 321. Now, the Wi-Fi use registration processing is completed. As shown in FIG. 7, management information 321 is a list of, in addition to the connection information acquired from each wireless router 50 (MAC address and final connection time), the mail address and the use language information acquired from intra-area terminal 20 associated with each other in each area (each identification information on wireless router 50).

S1307: When it is determined in step S1302 that the management information on intra-area terminal 20 has been registered, management information recorder 312 updates the final connection time out of the management information on intra-area terminal 20.

As shown in FIG. 12B, management device 30 transmits the acquired management information to corresponding translation terminal 10, for example, by the following processing.

S1401: Management information transmitter 313 determines connection with translation terminal 10. This connection may be made in response to a request transmitted at predetermined time intervals from management device 30 or translation terminal 10. When there is connection with translation terminal 10, the process proceeds to step S1402.

S1402: Management information transmitter 313 acquires identification information on translation terminal 10.

S1403: Based on the identification information on translation terminal 10, management information transmitter 313 determines the area of translation terminal 10 (corresponding wireless router 50). For example, for translation terminal 10 shown in FIG. 1, area A1 is determined.

S1404: Management information transmitter 313 transmits the management information on the corresponding area to translation terminal 10. For example, for translation terminal 10 shown in FIG. 1, management information 321A1 on area A1 (refer to FIG. 7) is transmitted. In addition to management information 321A1, management information 321A2 on area A2 associated based on relevant area information 321A is also transmitted.

Note that all the management information that management device 30 holds does not need to be transmitted to translation terminal 10. Out of the management information, only the language information and the information on the final connection time may be transmitted.

As described above, through the Wi-Fi use registration processing by management device 30, in addition to the MAC address information and the mail address information on intra-area terminal 20, the use language information from intra-area terminal 20 can be registered with management device 30. This allows management device 30 to acquire the use language information on intra-area terminal 20 connected to Wi-Fi, in addition to the connection information such as the MAC address information on intra-area terminal 20 currently connected to each wireless router 50. Translation terminal 10 accesses management device 30 at predetermined time intervals. Then, translation terminal 10 can acquire list information on the MAC address, the mail address, and the use language information on currently connected intra-area terminal 20 regarding wireless router 50 near the current location of translation terminal 10.

1-2-3. Operation of Translation Terminal

Figure 13:
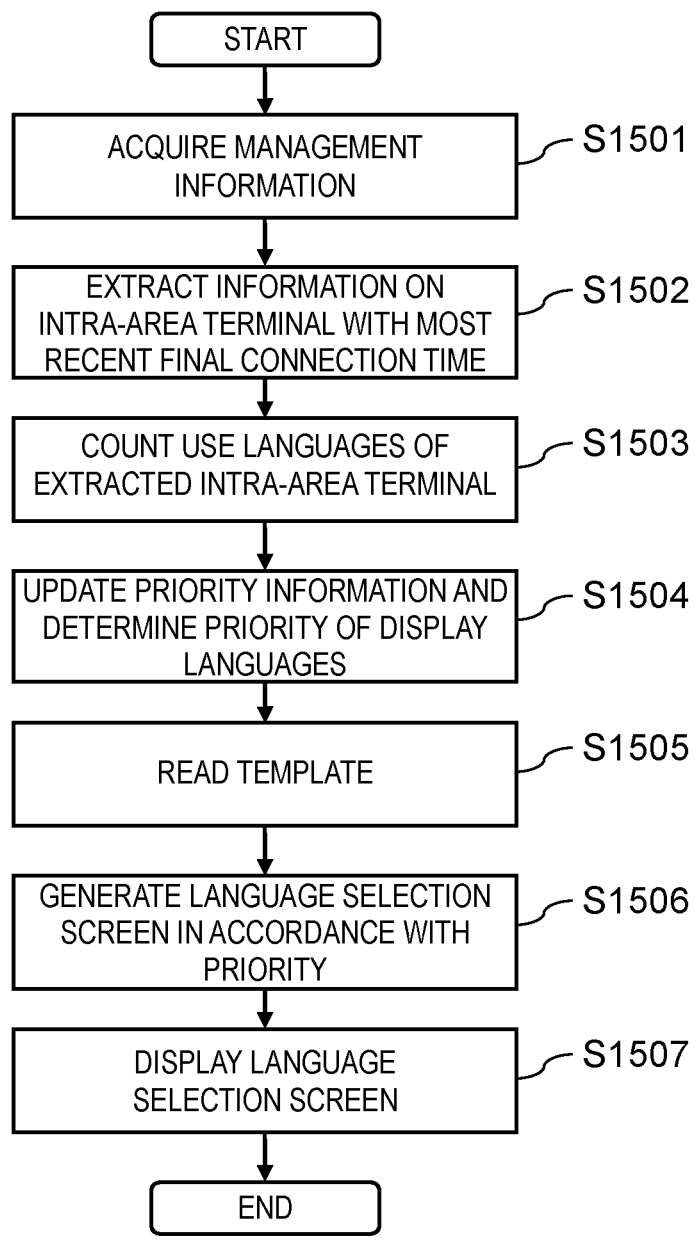
FIG. 13 is a flowchart showing processing to be performed by the translation terminal according to the first exemplary embodiment.

FIG. 13 shows processing to be mainly performed by language selection processor 110 of translation terminal 10 (refer to FIG. 8).

S1501: Management information acquisition unit 111 acquires the management information regarding intra-area terminal 20 connected in the area of translation terminal 10 from management device 30.

S1502: Priority determination unit 112 extracts intra-area terminal 20 with the most recent final connection time (for example, within 10 minutes).

S1503: Priority determination unit 112 counts use languages of extracted intra-area terminal 20.

S1504: Priority determination unit 112 updates the priority information, and determines the priority of display languages.

S1505: Language selection screen generator 113 reads language arrangement template 122.

S1506: Language selection screen generator 113 generates the language selection screen based on language arrangement template 122 in accordance with the determined priority order.

S1507: Display controller 114 displays the generated language selection screen on display 19.

Subsequently, the user of translation terminal 10 selects the language the user uses in accordance with the displayed language selection screen. This enables voice input in the selected language, and content is output in the selected language.

1-3. Features and Others

Translation terminal 10 according to the present exemplary embodiment (one example of the information display device) is an information display device for allowing content to be output in a plurality of languages, and includes management information acquisition unit 111, priority determination unit 112, and language selection screen generator 113 (one example of the image generator). Management information acquisition unit 111 acquires the management information including the language information including information indicating a language used by sojourners in the area where translation terminal 10 is used, and the sojourn information including information indicating the sojourn situation of the sojourners in the area. Based on the acquired management information, priority determination unit 112 determines the priority of the languages to be used in translation terminal 10. Based on the priority, language selection screen generator 113 generates the language selection screen (display image).

This makes it possible to dynamically collect the language information used in the predetermined area and to provide the language selection screen displaying more probable languages with priority.

Also, the management information may include the language information to be used by other sojourners in another area A2 close to area A1 where translation terminal 10 is used, and the sojourn situation indicating the sojourn situation of other sojourners in another area A2. This allows acquisition of the most recent language information of the neighboring area where users may have stayed. This makes it possible to provide the language selection screen displaying more probable languages with priority. That is, the language information over a plurality of areas can be managed and acquired, making it possible to provide the language selection screen displaying more probable languages with priority as an option.

Also, language selection screen generator 113 changes at least one of order and size of the language display in accordance with the priority. This allows the user to easily determine the language to select. Therefore, smooth and quick language selection can be achieved.

Information display system 100 according to the present exemplary embodiment is an information display system that can output content in a plurality of languages, and includes memory 32 (one example of the storage unit), priority determination unit 112, and language selection screen generator 113. Memory 32 stores the management information including the language information including information indicating the languages to be used by the sojourners in the predetermined area, and the sojourn information including information indicating the sojourn situation of the sojourners in the predetermined area. Based on the management information, priority determination unit 112 determines the priority of the languages to be used in information display system 100. Language selection screen generator 113 generates the language selection screen in accordance with the priority.

Also, translation terminal 10 and information display system 100 according to the present exemplary embodiment can be easily introduced by using existing wireless communication services.

1-4. Modified Example

In the above-described example, the language information has indicated the plurality of languages (for example, Vietnamese and Chinese) used by the plurality of sojourners. However, the present exemplary embodiment is not limited to this example. This modified example will describe an example in which the language information indicates one language with reference to FIG. 1, FIG. 7, and FIG. 8.

Management information acquisition unit 111 of translation terminal 10 acquires management information 321A1 from management device 30. Out of management information 321A1, priority determination unit 112 uses the most recent final connection time between intra-area terminal 20 and wireless router 50-1 as the sojourn information. In this example, the current time is 12:57, and thus the most recent final connection time is 12:55. Then, priority determination unit 112 uses a language corresponding to the most recent final connection time as the language information. In this example, the language corresponding to the most recent final connection time is Vietnamese. This language information may be, for example, information registered with wireless router 50-1 or management device 30 by a sojourner in order to use wireless router 50-1.

Priority determination unit 112 determines the priority based on management information 321A1. Specifically, priority determination unit 112 determines to enhance the Vietnamese priority order. Language selection screen generator 113 generates the language selection screen in accordance with the priority. Specifically, language selection screen generator 113 enhances the order of display of Vietnamese in the language selection screen. Furthermore, language selection screen generator 113 may change the display size of Vietnamese in the language selection screen.

As described above, translation terminal 10 may display the language selection screen in accordance with the language information of one language. Here, the language information may be information registered by the sojourners in order to use wireless router 50-1. Also, the sojourn information may include information indicating the final connection time between intra-area terminal 20 used by the sojourners and wireless router 50-1. This allows translation terminal 10 to easily acquire the language information and the sojourn information.

Second Exemplary Embodiment

A second exemplary embodiment according to the present disclosure will be described below. Configurations and functions similar to configurations and functions according to the first exemplary embodiment may not be described repeatedly and the same drawings and reference marks may be referred to.

2-1. Configuration

2-1-1. Configuration of System

Figure 14:
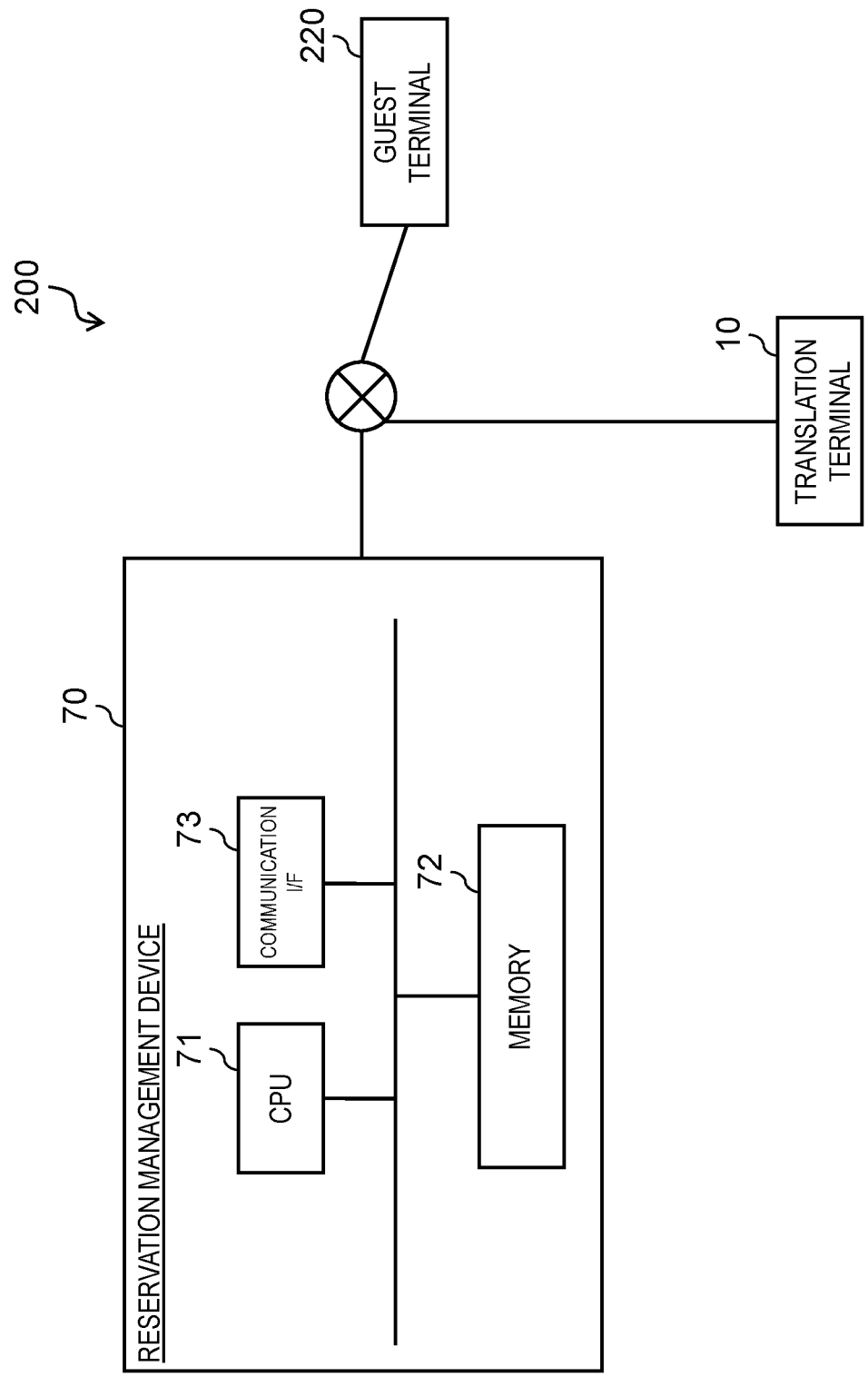
FIG. 14 is a schematic configuration diagram of an information display system according to a second exemplary embodiment.

FIG. 14 schematically shows an overall configuration of information display system 200 according to one exemplary embodiment of the present disclosure. Information display system 200 includes translation terminal 10 (one example of an information display device) and reservation management device 70 connectable to translation terminal 10 (one example of a management device). Reservation management device 70 manages reservation information on lodging facilities. Translation terminal 10 is installed and used in the lodging facilities. That is, in the present exemplary embodiment, an area where translation terminal 10 is used is the lodging facility sojourners use. Reservation management device 70 is connected to translation terminal 10 via a network such as the Internet.

In information display system 200, a guest connects to reservation management device 70 from guest terminal 220 the guest uses (one example of a computer terminal) via the WAN such as the Internet, and makes a lodging reservation. The reservation information accepted by reservation management device 70 is retained and managed by reservation management device 70.

Information display system 200 according to the present disclosure performs the following processing.

First, when reserving a lodging facility through network reservation, a guest registers information such as a name, contact address, and lodging date and time with reservation management device 70 of a hotel. At this time, reservation management device 70 acquires use language information of the guest together. Examples of a method for acquiring the use language information include a method for acquiring the use language the guest registers, and a method for automatically acquiring language information set for a browser, a terminal OS, and the like the guest uses when making a reservation. For example, when inputting reservation information through the network, the guest may select and input a language. Thus, when a predetermined language is selected, the selected language information is registered with reservation information as the use language.

Reservation management device 70 can create a list of guests who plan to check in on the day and the use language information. Also, reservation management device 70 can create a list of guests who have already checked in and the use language information. When translation terminal 10 is used in the lodging facility, translation terminal 10 acquires list information regarding use languages of the guests planning to check in on the day and the guests who have already checked in from reservation management device 70 at predetermined time intervals.

Information display system 200 according to the present disclosure acquires and manages the languages used by the guests together with existing reservation management information. Accordingly, information display system 200 counts a number of use, for each of the languages used by the guests of the lodging facility (a number of types and a frequency of each language), and reflects a count result on a language selection screen translation terminal 10 displays during language selection. Specifically, information display system 200 changes order, size, and the like for displaying the languages to select.

A configuration of each device according to the present exemplary embodiment will be described below.

2-1-2. Configuration of Reservation Management Device

As shown in FIG. 14, reservation management device 70 is a computer device including CPU 71, memory 72 (one example of a storage unit), and communication interface 73.

CPU 71 is a processor or a circuit that performs processing according to a predetermined program. Memory 72 is, for example, a semiconductor memory, and includes a ROM that stores a control program and the like describing a processing procedure of CPU 71, and a RAM that temporarily stores the control program and data temporarily as a work memory. Communication interface 73 includes a communication circuit for connecting to the WAN such as the Internet by wire or wirelessly. Communication interface 73 includes a communication circuit for communicating with translation terminal 10.

Figure 15:
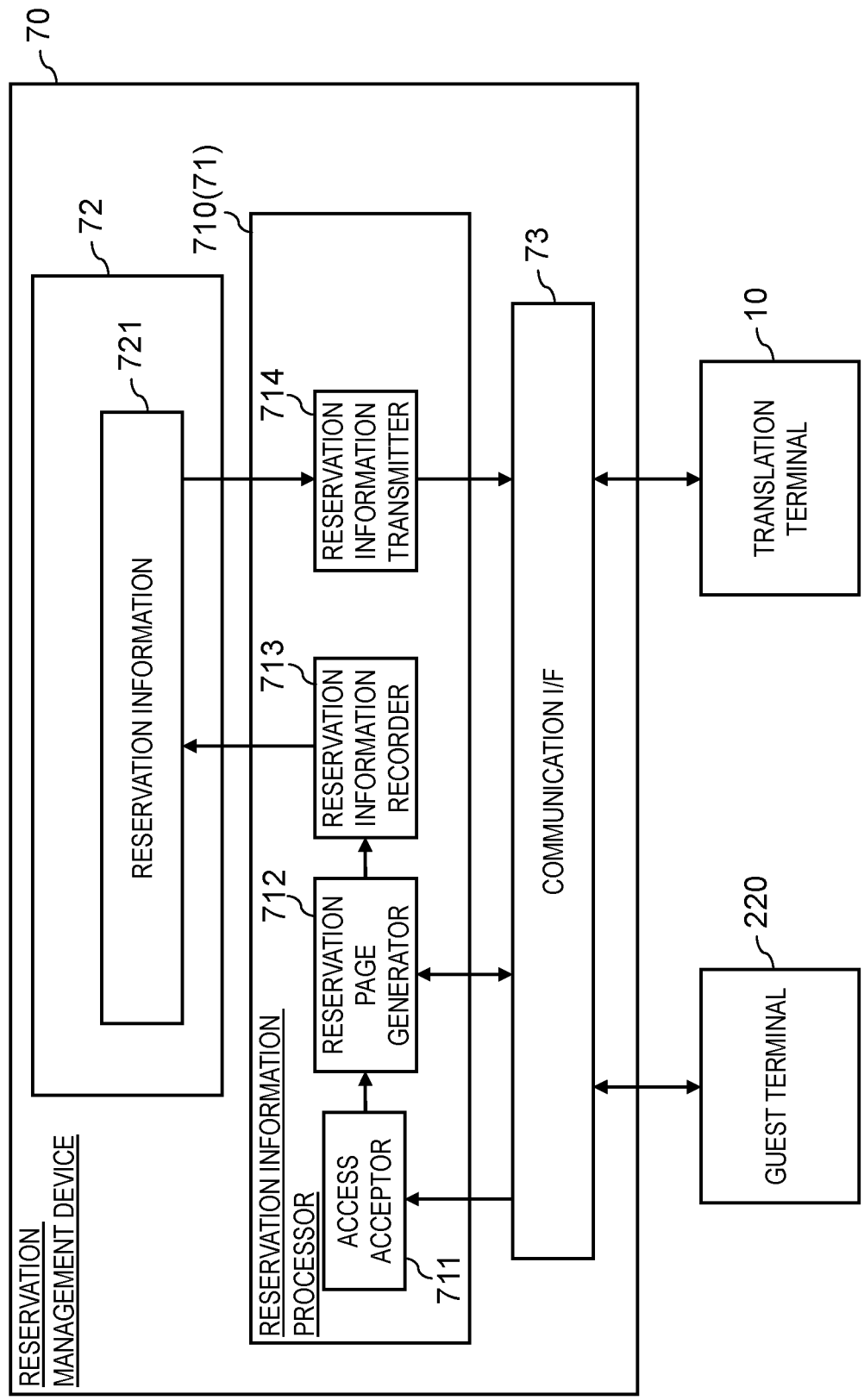
FIG. 15 is a functional block diagram of a reservation management device according to the second exemplary embodiment.

As shown in FIG. 15, CPU 71 implements a function of reservation information processor 710 to be performed according to a predetermined program stored in memory 72. Reservation information processor 710 includes access acceptor 711 (one example of an information acquisition unit), reservation page generator 712, reservation information recorder 713, and reservation information transmitter 714 (one example of a transmitter).

Access acceptor 711 accepts access from guest terminal 220. Guest terminal 220 has a configuration similar to a configuration of intra-area terminal 20 of the first exemplary embodiment (refer to FIG. 3).

Based on language information from guest terminal 220, reservation page generator 712 generates a reservation page in the language.

Figure 16:
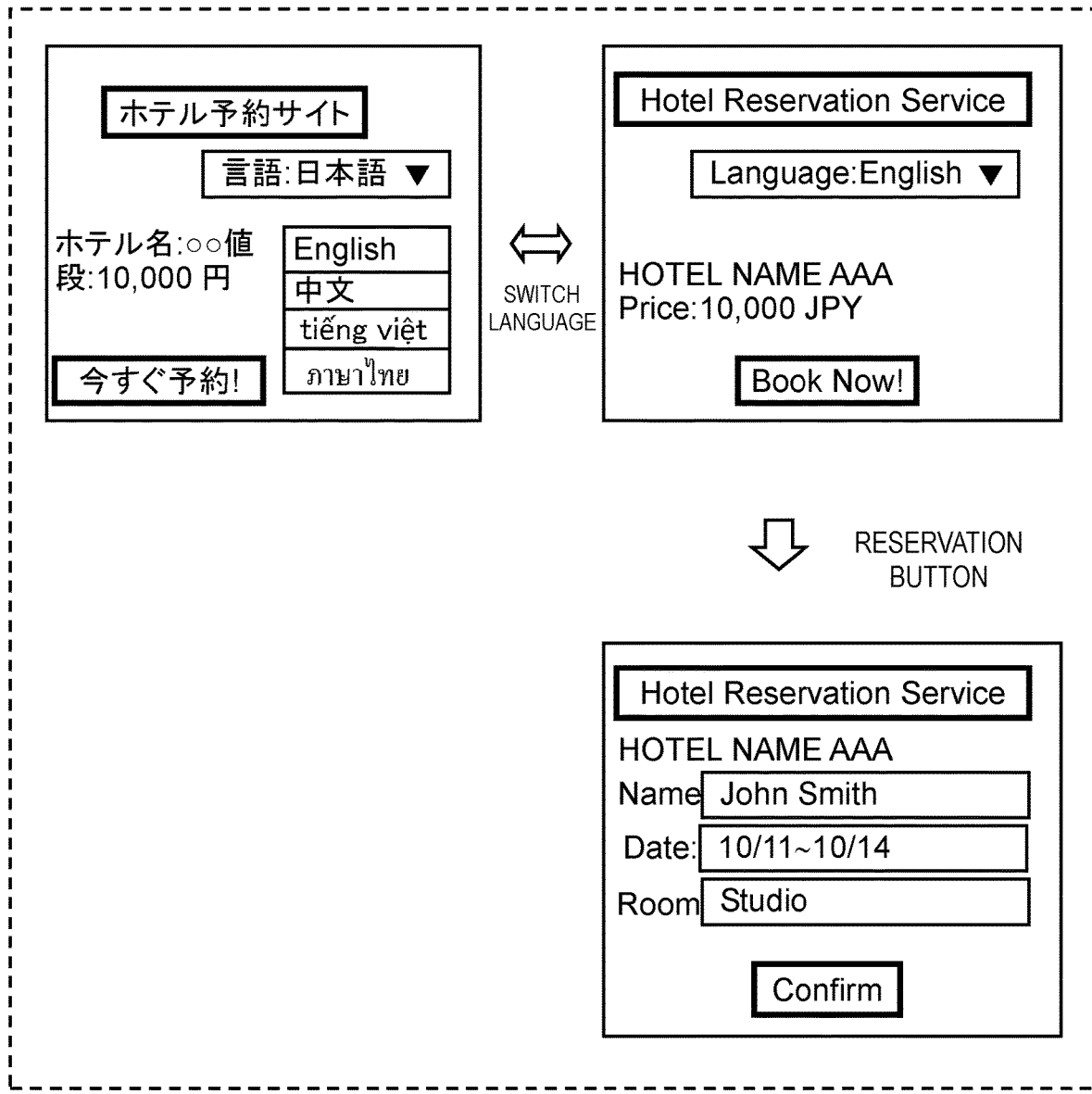
FIG. 16 is a diagram showing a screen example provided by the reservation management device according to the second exemplary embodiment.

FIG. 16 shows an example of the reservation page generated. Reservation page generator 712 generates the reservation page in accordance with a default language or the language information obtained from access information from guest terminal 220, and causes a display of guest terminal 220 to display the reservation page via a browser. When the language of the displayed reservation page is not the language the guest uses, the guest switches the language by an input operation of guest terminal 220. The reservation information that is input into the reservation page and decided is transmitted to reservation management device 70.

Reservation information recorder 713 records the acquired reservation information in memory 72 as reservation information 721.

Figure 17:
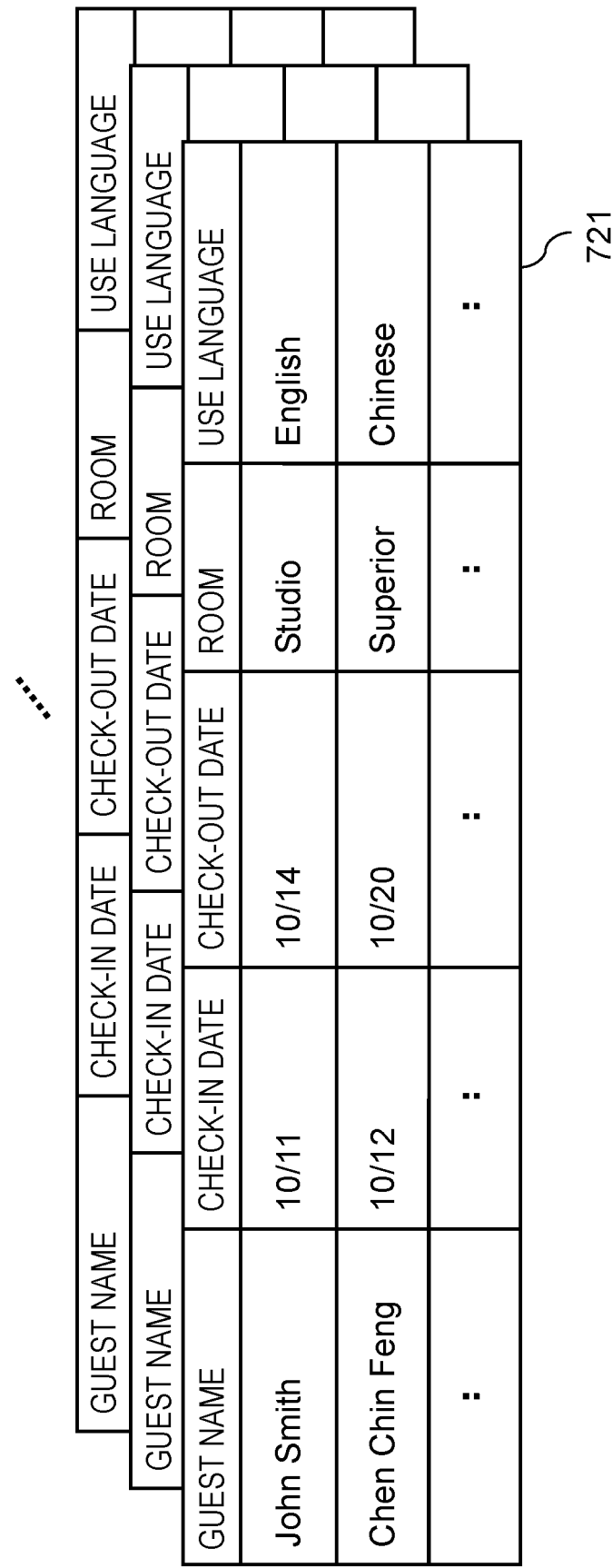
FIG. 17 is a diagram showing an example of reservation information according to the second exemplary embodiment.

FIG. 17 shows an example of the reservation information acquired. Reservation information 721 includes the use language besides a guest name, a check-in date, a check-out date, and a room type. If scheduled check-in time and scheduled check-out time are clear, reservation information 721 may include a sojourn time interval. When reservation management device 70 collectively manages the reservation information on a plurality of lodging facilities, as shown in FIG. 17, reservation information 721 is generated for each lodging facility.

Reservation information transmitter 714 transmits, to translation terminal 10, the reservation information on the target lodging facility for which translation terminal 10 is used. Based on the reservation information, translation terminal 10 counts languages with a strong possibility of being currently used by the guests of the lodging facility, and generates priority information.

2-2. Operation

An operation of information display system 200 according to the second exemplary embodiment will be described below with reference to FIG. 18A, FIG. 18B, and FIG. 19.

2-2-1. Operation of Reservation Management Device

Figure 18B:
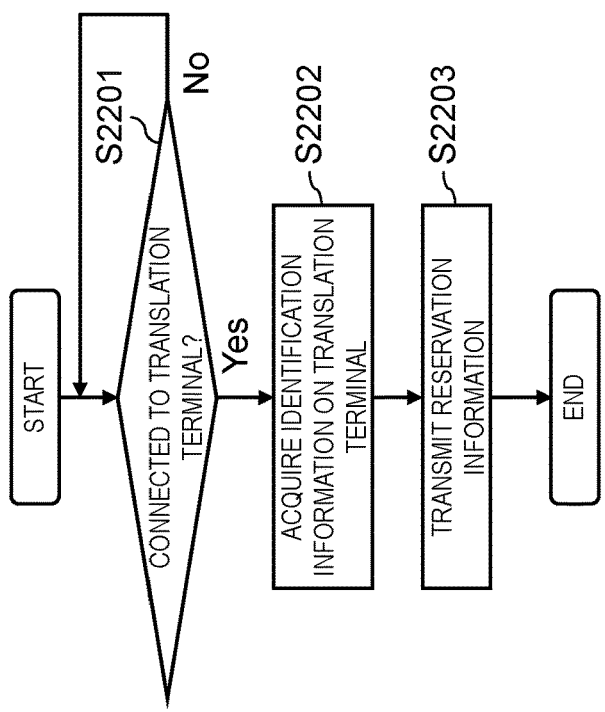
FIG. 18B is a flowchart showing processing to be performed by the reservation management device according to the second exemplary embodiment.
Figure 18A:
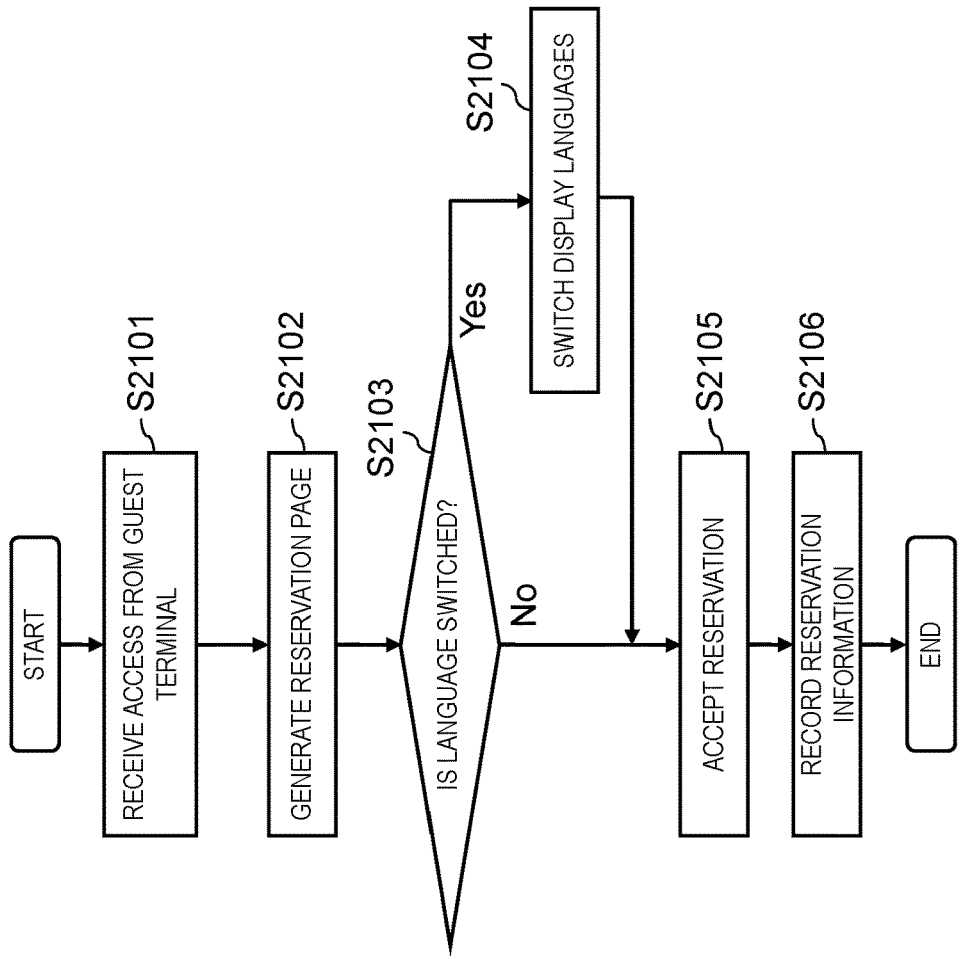
FIG. 18A is a flowchart showing processing to be performed by the reservation management device according to the second exemplary embodiment.

FIG. 18A shows processing to be mainly performed by reservation information processor 710 of reservation management device 70 (refer to FIG. 15).

S2101: Access acceptor 711 receives access from guest terminal 220. At this time, a language with a strong possibility that guests will use is set. As the language with a strong possibility that the guests will use, a default language may be set, or a language with a strong possibility that the guests will use may be set based on information from guest terminal 220 as described above.

S2102: Reservation page generator 712 generates the lodging facility reservation page in the set language.

S2103: When language switch setting is performed by guest terminal 220, the process proceeds to step S2104.

S2104: Reservation page generator 712 switches display languages in accordance with setting information from guest terminal 220, and generates the reservation page.

S2105: A reservation is accepted by input from guest terminal 220.

S2106: Reservation information recorder 713 records the reservation information. At this time, the language information is acquired together, and details of the reservation and the language information are associated with each other and recorded as reservation information 721. In this case, when the language is switched in step S2104, the language information is the switched language, whereas when the language is not switched, the language information is the language set in step S2101.

As shown in FIG. 18B, reservation management device 70 transmits the reservation information to translation terminal 10, for example, by the following processing.

S2201: Reservation information transmitter 714 determines connection with translation terminal 10. This connection may be made in response to a request transmitted at predetermined time intervals from reservation management device 70 or translation terminal 10. When there is connection with translation terminal 10, the process proceeds to step S2202.

S2202: Access acceptor 711 acquires identification information on translation terminal 10. Note that when a plurality of translation terminals 10 is used in one lodging facility, or when reservation management device 70 manages the reservation information on a plurality of lodging facilities, reservation management device 70 retains information in which translation terminal 10 is associated with identification information on the lodging facility where translation terminal 10 is used. Then, reservation management device 70 transmits the reservation information on the lodging facility in accordance with the identification information on translation terminal 10.

S2203: Reservation information transmitter 714 transmits the reservation information on the corresponding lodging facility.

Note that all the reservation information does not need to be transmitted to translation terminal 10. Out of the reservation information, only the language information and information on the lodging reservation date (or scheduled check-in or check-out date and time) may be transmitted.

2-2-2. Operation of Translation Terminal

Figure 19:
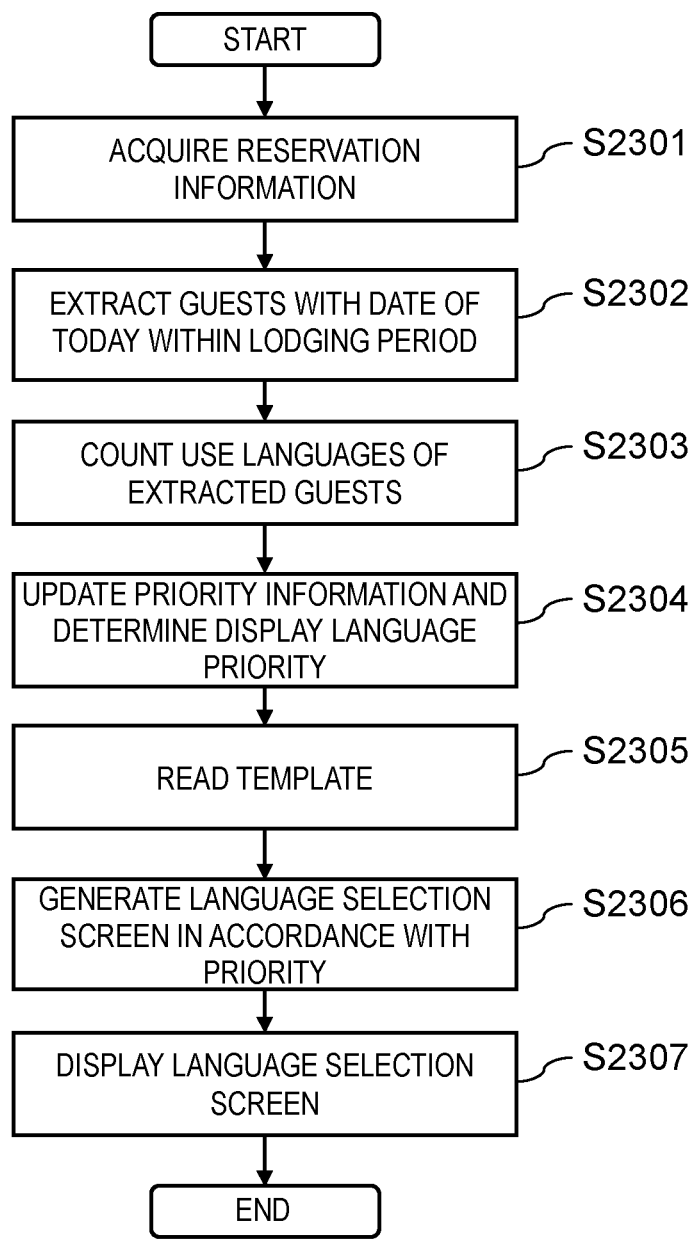
FIG. 19 is a flowchart showing processing to be performed by a translation terminal according to the second exemplary embodiment.

FIG. 19 shows processing to be performed by language selection processor 110 of translation terminal 10 according to the present exemplary embodiment (refer to FIG. 8).

S2301: Management information acquisition unit 111 acquires the reservation information regarding the lodging facility associated with translation terminal 10 (the language information and a check-in date or a check-out date) from reservation management device 70.

S2302: Priority determination unit 112 extracts guests with a date of the day within a lodging period.

S2303: Priority determination unit 112 counts a number of languages used by the extracted guests (a number of types and a frequency of each language).

S2304: Priority determination unit 112 updates the priority information, and determines priority order of display languages.

S2305: Language selection screen generator 113 reads language arrangement template 122.

S2306: Language selection screen generator 113 generates the language selection screen in accordance with the determined priority order.

S2307: Display controller 114 displays the generated language selection screen on display 19.

Subsequently, a user of translation terminal 10 selects the language the user uses in accordance with the displayed language selection screen. This enables voice input in the selected language, and content is output in the selected language.

2-3. Features and Others

In addition to or in place of effects of the first exemplary embodiment and the like, translation terminal 10 (one example of the information display device) or information display system 200 according to the present exemplary embodiment can be easily introduced by using an existing lodging reservation system.

2-4. Modified Example

Reservation management device 70 may be installed in the lodging facility and connected to translation terminal 10 by the LAN.

As in the first exemplary embodiment, information display system 200 may include management device 30. In this case, management device 30 may acquire and retain only the identification information and the language information on translation terminal 10 associated with the lodging facility from the reservation information of reservation management device 70, and regularly transmit the language information to translation terminal 10.

Reservation management device 70 may acquire the use language information of the guests from nationality of passports.

Reservation management device 70 may not be limited to the reservation management device of the lodging facility, but may be used as a restaurant reservation management device. In this case, translation terminal 10 may be used at a restaurant, and the priority of the use language may be determined from the reservation information retained by the reservation management device (language information selected during reservation and reservation date and time).

Other Exemplary Embodiments

The first and second exemplary embodiments have been described above to illustrate techniques to disclose in the present application. However, the techniques in the present disclosure are not limited to the first and second exemplary embodiments, and are applicable to exemplary embodiments in which changes, replacements, additions, omissions, or the like are made as appropriate. Furthermore, it is possible to form a new exemplary embodiment by combining the components and the functions described in the first and second exemplary embodiments.

Therefore, other exemplary embodiments will be illustrated below.

[1] In the above-described first and second exemplary embodiments, the language information used in the predetermined area has been acquired by using free Wi-Fi registration information or the reservation information of the lodging facility. However, the present disclosure is not limited to this example. For example, the language information and the sojourn situation of the sojourner in the predetermined area may be acquired by using information acquired in the following cases.

Use Record Information at Restaurant

At a restaurant, a menu in various languages is prepared for foreigners. A guest places an order by using an order terminal installed on each table or a paper menu in various languages.

When using the order terminal installed on each table, the guest first selects the display language. A restaurant information management terminal makes a list of language information selected at this time. At this time, the restaurant information management terminal may make a list of the selected language information and selection time information together. Translation terminal 10 regularly acquires list information on the selected language information regarding the restaurant near the current location of translation terminal 10 and the selection time information. Based on the acquired language list information, translation terminal 10 acquires information on a number of persons who use each language, and reflects this result on translation terminal 10. Specifically, translation terminal 10 changes order, size, or the like of language display in the language screen to be displayed during language selection.

Note that when the paper menu in various languages is used, for example, an integrated circuit (IC) tag may be affixed on the menu and a list of events of the IC tag passing through a predetermined point may be made. For example, a list of information is created indicating what time and what minute a Vietnamese menu passes through the predetermined point. Translation terminal 10 regularly acquires the list information about what time and what minute a menu of which language passes through a predetermined point regarding a restaurant near the current location of translation terminal 10.

The predetermined area in this case is, for example, an area near an exit of the restaurant. At each table in the restaurant, the language has already been specified because a restaurant user refers to a menu in a language the user likes. Meanwhile, a user near the exit has a strong possibility of being a person who has had a meal in the restaurant in a time slot slightly before. That is, by referring to a language use situation in the restaurant in the time slot, it is possible to estimate the language of the person who is near the exit at the current time. Based on the acquired language list information, translation terminal 10 installed in the predetermined area acquires information on the number of persons who use each language, and reflects this result on translation terminal 10. Specifically, translation terminal 10 changes display order, display size, and the like of the language list displayed during language selection.

Use Record Information at Airport

At an airport, information such as aircraft arrival-and-departure information and aircraft passenger information is acquired and managed. For example, use language information of passengers is registered together during aircraft boarding procedures. When translation terminal 10 is used in an airport lobby, the aircraft arrival-and-departure information regarding a boarding gate and an arrival gate near translation terminal 10, and information regarding passengers who perform reservation or boarding procedures of aircrafts that take off or land at the boarding gate and the arrival gate near translation terminal 10 are acquired regularly. Translation terminal 10 can acquire information on a number of foreigners who use each language from the passenger information. Also, inThrmation regarding a destination country or a departure country is acquired from the aircraft arrival-and-departure information. For example, it is possible to estimate to some extent language distribution the passengers use by having in advance distribution information of languages used in the destination country or the departure country.

The predetermined area in this case is, for example, an area near an information center in the airport. Translation terminal 10 installed in the information center guesses the most recent distribution of the number of people who use each language in the predetermined area based on the acquired information described above, and reflects this result on translation terminal 10. Specifically, translation terminal 10 changes display order, display size, and the like of a candidate language list to display during language selection.

Use Record Information at Facility

At facilities such as art galleries, museums, and theme parks, exhibits are explained in foreign languages. Some art galleries and museums lend a headset with which an explanatory note is played back in various languages for foreigners. Apps for smartphones are also prepared for displaying the explanatory note on a smartphone screen in a language of a user when the user reads identification (ID) information attached to each explanatory note (bar code or the like) with the smartphone.

When headsets for respective languages are prepared individually, a list of use record (and use time) of the headsets for respective languages is made. When the user of the headset needs to select a language first, a list of setting records (and setting time) of respective languages is made. When the app for smartphones is used, a list of language setting information and app use time of the smartphone is made.

Translation terminal 10 regularly acquires language list information created as described above regarding art galleries, museums, or theme parks near the current location of translation terminal 10.

The predetermined area in this case is, for example, an area near an exit of art galleries, museums, or theme parks. Based on the acquired language list information, translation terminal 10 installed in the predetermined area acquires the most recent information on the number of people who use each language in the predetermined area, and reflects this result on translation terminal 10. Specifically, translation terminal 10 changes display order, display size, and the like of a candidate language list to display during language selection.

Information from Street Camera

A use language list of foreigners is created from imaging information by a street camera. Specifically, a list of information on the number of users of each language in a specified period in the predetermined area is created, by a method for guessing the use language from face information of a person captured with the camera, or a method for determining the use language from the language information displayed on a screen of the smartphone of the person captured with the camera. Translation terminal 10 regularly acquires the list of information on the number of users of each language in the specified period regarding the street camera near the area of translation terminal 10.

Based on the acquired language list information, translation terminal 10 acquires the most recent information on the number of people who use each language in the predetermined area, and reflects this result on translation terminal 10. Specifically, translation terminal 10 changes display order, display size, and the like of a candidate language list to display during language selection.

Information from Street Microphone

From sound information collected using a street microphone, a use language list of an area of the microphone is created. Specifically, a list of information on the number of users of each language in the specified period in the predetermined area is created by a method for guessing the use language from conversation voices collected with the microphone. Translation terminal 10 regularly acquires the list of information on the number of users of each language in the specified period regarding the street microphone near the area where translation terminal 10 is present.

The predetermined area in this case is an area around the street microphone. Based on the acquired language list information, translation terminal 10 installed in the predetermined area acquires the most recent information on the number of people who use each language in the predetermined area, and reflects this result on translation terminal 10. Specifically, translation terminal 10 changes display order, display size, and the like of a candidate language list to display during language selection.

Access Control Information

In an area where access control with an IC card or the like is performed, ID information of a person who stays in the area is managed. It is possible to store and manage in advance the ID information and the use language information of the person in association with each other, and to create the use language list information in the area. When translation terminal 10 is used in such an area where access control is performed, translation terminal 10 regularly acquires the use language list information in the area.

Based on the acquired language list information, translation terminal 10 acquires the most recent information on the number of people who use each language in the predetermined area, and reflects this result on translation terminal 10. Specifically, translation terminal 10 changes display order, display size, and the like of a candidate language list to display during language selection.

As the management information, translation terminal 10 may request and acquire only the most recent use language information in the area, the most recent sojourn time point (final connection time with a wireless access point or the like) and sojourn time interval (reservation period, reservation date and time, or the like) of the sojourner in the area.

Also, translation terminal 10 may acquire another sojourn situation other than the sojourn time point, the sojourn time interval, and a probability that the user will leave the area, and reflect the sojourn situation on priority determination.

Alternatively, only use language information may be acquired as the management information. For example, translation terminal 10 may acquire and count the language information with a use record in the area, and generate the priority information.

In the above-described exemplary embodiments, the function of priority determination unit 112 is provided in translation terminal 10, but may be provided in a computer device connectable to translation terminal 10 (management device 30 and wireless router 50 in the first exemplary embodiment, reservation management device 70 in the second exemplary embodiment, and others). In this case, priority determination unit 112 may transmit the priority information in response to a request of translation terminal 10.

The above-described exemplary embodiments have cited an example in which translation terminal 10 is used in the predetermined area and the identification information includes area information. However, the present disclosure is not limited to this example. Translation terminal 10 may be provided with a position information distinguishing unit, such as a global positioning system (GPS), and the area may be determined from the position information.

All or an arbitrary part of processing functions of translation terminal 10, management device 30, wireless router 50, and reservation management device 70 according to the above-described exemplary embodiments may be performed, for example, on a control circuit of a CPU (or a microcomputer such as a micro processing unit (MPU) and a micro controller unit (MCU)). Also, all or an arbitrary part of the processing functions may be performed on a program analyzed and executed by a CPU (or a microcomputer such as an MPU and an MCU), or on hardware with wired logic.

Each processor may be configured by one or more processors or circuits. Translation terminal 10, management device 30, wireless router 50, and reservation management device 70 may be configured by one or more semiconductor chips.

Translation terminal 10, information display system 100, or information display system 200 may be implemented by a plurality of devices connected by a network.

The information display device may be a digital signage display terminal, in place of translation terminal 10. In this case, instead of language selection screen generator 113, a content screen generator (one example of the image generator) determines the language of signage content to be displayed on display 19 based on the priority. That is, the content screen generator generates images for displaying the content. In this case, the language arrangement template is unnecessary, and a rate of display time or display frequency of content to play may be determined by the priority, for example, after displaying five times content in a language with the highest priority, displaying twice content in a language with the second highest priority. That is, display controller 114 may change a number of times of output or an output period of the content in accordance with the priority. Also, the content screen generator may display subtitles in a plurality of languages on the content and change a size or position of characters of the subtitles on the content in accordance with the priority. For example, the subtitles in a language with high priority are preferably large or positioned in an upper place.

The flowcharts according to the above-described exemplary embodiments are not limited to the description in the above-described exemplary embodiments in terms of execution order. Part of the flowcharts may be executed in parallel, and the execution order may be changed, without departing from the spirit of the disclosure.

Translation terminal 10, information display system 100, or information display system 200 according to the present disclosure is not limited to being executed in the above-described exemplary embodiments. An information display method executed by translation terminal 10, information display system 100, or information display system 200, a computer program for executing the method, and a computer-readable recording medium recording such a program are included in the scope of the present disclosure. Here, examples of the computer-readable recording medium include a flexible disk, a hard disk, a compact disc read-only memory (CD-ROM), a magneto-optical disk (MO), a digital versatile disc (DVD), a DVD-ROM, a DVD-RAM, a Blu-ray (registered trade mark) disc (BD), and a semiconductor memory.

The above-described computer program is not limited to a computer program recorded on the above-described recording medium and may be a computer program that is transferred via an electric communication line, a wireless or wired communication line, and a network represented by the Internet, or the like.

INDUSTRIAL APPLICABILITY

The present disclosure can be used as a computer terminal or a system used in services that support communication between different languages, such as translation services.

REFERENCE MARKS IN THE DRAWINGS

10: translation terminal (information display device)
11: CPU
12: memory
13: communication interface
14: input interface
15: microphone
16: output interface
17: speaker
18: input unit
19: display
20: intra-area terminal (computer terminal)
21: CPU
22: memory
23: communication interface
28: input unit
29: display
30: management device
31: CPU
32: memory (storage unit)
33: communication interface
50: wireless router (wireless access point)
51: CPU
52: memory
53: WAN interface
54: LAN interface
70: reservation management device
71: CPU
72: memory
73: communication interface
100: information display system
110: language selection processor
111: management information acquisition unit
112: priority determination unit
113: language selection screen generator (image generator)
114: display controller
115: language selection acceptor
191: language selection screen 200: information display system
220: guest terminal (computer terminal)
291: language selection screen
310: management information processor
311: management information acquisition unit (information acquisition unit)
312: management information recorder
313: management information transmitter (transmitter)
510: connection information processor
511: access acceptor
512: connection information recorder
513: connection information transmitter
710: reservation information processor
711: access acceptor
712: reservation page generator
713: reservation information recorder
714: reservation information transmitter

The invention claimed is:

1. An information display device for allowing content to be output in a plurality of languages, the information display device comprising:
   a management information acquisition unit that acquires management information including: language information including information indicating a plurality of languages used by a plurality of current sojourners who are currently staying in an area where the information display device is used;
   a priority determination unit that determines the plurality of current sojourners, determines numbers of sojourners who use the plurality of languages, respectively, among the plurality of current sojourners, and determines priority of each of the plurality of languages used in the information display device based on the acquired management information and the numbers of sojourners who use the plurality of languages; and
   an image generator that generates a display image in accordance with the priority, the display image being for selecting one of the plurality of languages, wherein:
   the image generator generates, as the display image, an image including a plurality of display areas corresponding to the plurality of languages, respectively, and displays a display area corresponding to a language having a highest priority prior to remaining display areas.

2. The information display device according to claim 1, wherein the language information further includes information indicating a language used by another sojourner in another area different from the area.

3. The information display device according to claim 1, wherein:
   the management information further includes sojourn information including information indicating a sojourn situation of the plurality of current sojourners in the area, and
   the sojourn information further includes information indicating sojourn time points of the plurality of current sojourners in the area.

4. The information display device according to claim 1, wherein
   the area is a facility the plurality of current sojourners use, and
   the management information acquisition unit further acquires reservation information on the facility as the management information.

5. The information display device according to claim 1, wherein the management information acquisition unit acquires the management information at predetermined time intervals.

6. The information display device according to claim 1, wherein the priority determination unit determines the priority based on a default value in addition to the acquired management information.

7. An information display system comprising:
   the information display device according to claim 1; and
   a management device connectable to the information display device,
   wherein the management device includes:
      an information acquisition unit that acquires the management information;
      a storage unit that stores the management information; and
      a transmitter that transmits the management information to the information display device.

8. The information display system according to claim 7, wherein the information acquisition unit acquires languages used with computer terminals used by the plurality of current sojourners or information that is input into the plurality of computer terminal terminals, respectively, as the language information.

9. The information display device according to claim 1, wherein:
   the management information further includes sojourn information including information indicating a sojourn situation of sojourners in the area, and
   the sojourn information includes information indicating connection times of computer terminals used by the sojourners to a wireless access point located in the area, respectively, and
   the priority determination unit determines the plurality of current sojourners based on the connection times.

10. The information display device according to claim 9, wherein the management information acquisition unit acquires the language information via the wireless access point.

11. The information display device according to claim 10, wherein the language information comprises information registered by the plurality of current sojourners in order to use the wireless access point.

12. The information display device according to claim 9, wherein the sojourn information further includes information indicating final connection times of computer terminals used by the sojourners to the wireless access point located in the area, respectively, and
   the priority determination unit that determines the plurality of current sojourners when the final connection times are within a predetermined time from a current time point.

13. The information display device according to claim 1, wherein the priority determination unit gives the highest priority to the language when a number of the current sojourns using the language is largest.

14. The information display device according to claim 1, wherein the image generator displays the display area corresponding to the language having the highest priority with the larger size than the remaining display areas.

15. An information display device for allowing content to be output in a plurality of languages, the information display device comprising:
   a management information acquisition unit that acquires management information including: language information including information indicating a plurality of languages used by a plurality of current sojourners who are currently staying in an area where the information display device is used;

a priority determination unit that determines the plurality of current sojourners, determines numbers of sojourners who use the plurality of languages, respectively, among the plurality of current sojourners, and determines priority of each of the plurality of languages used in the information display device based on the acquired management information and the numbers of sojourners who use the plurality of languages; and an image generator that generates a display image in accordance with the priority, wherein:

the image generator generates, as the display image, an image including a plurality of subtitles corresponding to the plurality of languages, respectively, and displays a subtitle corresponding to a language having a highest priority prior to remaining subtitles.

16. The information display device according to claim 15, wherein the image generator displays the subtitle corresponding to the language having the highest priority with the larger size than the remaining subtitles.

17. An information display device for allowing content to be output in a plurality of languages, the information display device comprising:

a management information acquisition unit that acquires management information including: language information including information indicating a plurality of languages used by a plurality of current sojourners who are currently staying in an area where the information display device is used;

a priority determination unit that determines the plurality of current sojourners, determines numbers of sojourners who use the plurality of languages, respectively, among the plurality of current sojourners, and determines priority of each of the plurality of languages used in the information display device based on the acquired management information and the numbers of sojourners who use the plurality of languages;

an image generator that generates a display image in accordance with the priority; and a display controller that controls the display image, wherein:

the image generator generates, as the display image, a plurality of content display images in the plurality of languages, respectively, and the display controller determines a number of times of output or an output period of the plurality of content display images, and displays a content display image corresponding to a language having a highest priority to remaining content display images.

18. The information display device according to claim 17, wherein the image generator displays the content display image corresponding to the language having the highest priority with a larger number of times or a longer output period than the remaining content display images.

19. An information display system for allowing content to be output in a plurality of languages, the information display system comprising:

a storage unit that stores management information including: language information including information indicating a plurality of languages used by a plurality of current sojourners who are currently staying sojourner in a predetermined area;

a priority determination unit that determines the plurality of current sojourners, determines numbers of sojourners who use the plurality of languages, respectively, among the plurality of current sojourners, and determines priority of each of the plurality of languages used in the information display system based on the management information and the numbers of sojourners who use the plurality of languages; and an image generator that generates a display image in accordance with the priority, the display image being for selecting one of the plurality of languages, wherein the image generator generates, as the display image, an image including a plurality of display areas corresponding to the plurality of languages, respectively, and displays a display area corresponding to a language having a highest priority prior to remaining display areas.

* * * * *